(12) United States Patent
Lee et al.

(10) Patent No.: US 10,869,014 B2
(45) Date of Patent: Dec. 15, 2020

(54) VEHICLE DISPLAY DEVICE

(71) Applicant: LG Electronics Inc., Seoul (KR)

(72) Inventors: Yonguk Lee, Seoul (KR); Sunghwan Jun, Seoul (KR); Kyunglack Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/329,453

(22) PCT Filed: Dec. 23, 2016

(86) PCT No.: PCT/KR2016/015223
§ 371 (c)(1),
(2) Date: Feb. 28, 2019

(87) PCT Pub. No.: WO2018/043836
PCT Pub. Date: Mar. 8, 2018

(65) Prior Publication Data
US 2019/0222820 A1    Jul. 18, 2019

(30) Foreign Application Priority Data

Aug. 30, 2016   (KR) .......................... 10-2016-0111094

(51) Int. Cl.
*H04N 13/125*   (2018.01)
*H04N 13/315*   (2018.01)
(Continued)

(52) U.S. Cl.
CPC ........... *H04N 13/125* (2018.05); *B60K 35/00* (2013.01); *B60K 37/02* (2013.01); *B60W 50/14* (2013.01);
(Continued)

(58) Field of Classification Search
CPC ........ B60K 35/00; B60K 37/02; H04N 13/31; H04N 13/125; H04N 13/128; H04N 13/122; H04N 13/0239
See application file for complete search history.

(56) References Cited

U.S. PATENT DOCUMENTS

2013/0208097 A1*  8/2013  Ha ...................... H04N 13/133
                                                            348/47
2013/0293793 A1   11/2013  Lu
(Continued)

FOREIGN PATENT DOCUMENTS

KR       20060078165        7/2006
KR       20120051287        5/2012
(Continued)

OTHER PUBLICATIONS

EP Supplementary Search Report in European Application No. EP16915316, dated Mar. 12, 2020, 8 pages.

*Primary Examiner* — Obafemi O Sosanya
(74) *Attorney, Agent, or Firm* — Fish & Richardson P.C.

(57) ABSTRACT

Disclosed is a display apparatus for vehicle including: a display unit configured to include a barrier unit and an image output unit; and a processor configured to output a parallax barrier 3D image to the display unit by implementing a parallax barrier in the barrier unit and outputting a disparity image to the image output unit, and to adjust an open slit ratio of the barrier unit based on an average luminance value of the disparity image.

17 Claims, 19 Drawing Sheets

(51) Int. Cl.
*B60K 35/00* (2006.01)
*B60K 37/02* (2006.01)
*B60W 50/14* (2020.01)

(52) U.S. Cl.
CPC ..... *H04N 13/315* (2018.05); *B60W 2050/143* (2013.01); *B60W 2050/146* (2013.01)

(56) References Cited

U.S. PATENT DOCUMENTS

2014/0292789 A1   10/2014  Kim et al.
2015/0245007 A1*  8/2015  Hyodo ................ H04N 13/122
                                                    382/154

FOREIGN PATENT DOCUMENTS

KR      20130061483     6/2013
KR      20130093935     8/2013

* cited by examiner $$ABL(\%) = \frac{\sum_{i}^{N \times M}(Y)_i}{N \times M}$$

where, $(Y)_i$ is gray level of RGB pixel $i$

VEHICLE DISPLAY DEVICE

CROSS-REFERENCE TO RELATED APPLICATIONS

This application is a National Stage application under 35 U.S.C. § 371 of International Application No. PCT/KR2016/015223, filed on Dec. 23, 2016, which claims the benefit of Korean Application No. 10-2016-0111094, filed on Aug. 30, 2016. The disclosures of the prior applications are incorporated by reference in their entirety.

TECHNICAL FIELD

The present invention relates to a display apparatus for vehicle and a control method thereof.

BACKGROUND ART

A vehicle is an apparatus that is moved in a direction desired by a boarding user. Typically, an automobile is an example of the vehicle.

Meanwhile, for the convenience of a user who uses the vehicle, various sensors and electronic devices are provided. In particular, various devices for the convenience of the user are being developed.

As the vehicle is equipped with various electronic devices, various comfort equipment or systems are mounted in the vehicle.

In addition, there is a display apparatus for outputting a parallax barrier 3D image which is a 3D image that a viewer can see without wearing glasses. The parallax barrier 3D image can achieve a 3D image providing a three-dimensional effect when the viewer's line of sight is within a viewing range.

However, when the luminance of the parallax barrier 3D image is high, there is a problem that crosstalk which is a noise of the parallax barrier 3D image increases.

In addition, since the luminance of the parallax barrier 3D image can be reduced due to a parallax barrier, there is a problem that the user feels that the parallax barrier 3D image is dark.

Accordingly, a technology for appropriately adjusting the luminance or crosstalk value of the parallax barrier 3D image has been studied.

DISCLOSURE

Technical Problem

The present invention has been made in view of the above problems, and provides a display apparatus for vehicle which appropriately adjusts the luminance or crosstalk value of a parallax barrier 3D image by controlling an open slit ratio of a parallax barrier to be inversely proportional to a luminance of a disparity image, and a control method thereof.

In addition, the present invention further provide a display apparatus for vehicle for outputting a selected image to a partial area of a display unit selected by a user and adjusting an open slit ratio of a barrier unit to correspond to each area, and a control method thereof.

The problems of the present invention are not limited to the above-mentioned problems, and other problems not mentioned can be clearly understood by those skilled in the art from the following description.

Technical Solution

According to an aspect of the present invention, there is provided a display apparatus for vehicle, including: a display unit configured to include a barrier unit and an image output unit; and a processor configured to output a parallax barrier 3D image to the display unit by implementing a parallax barrier in the barrier unit and outputting a disparity image to the image output unit, and to adjust an open slit ratio of the barrier unit based on an average luminance value of the disparity image.

According to an aspect of the present invention, there is provided a method of controlling a display apparatus for vehicle for outputting a parallax barrier 3D image, including: outputting a parallax barrier 3D image by outputting a disparity image to an image output unit and implementing a parallax barrier in a barrier unit; measuring an average luminance value of the disparity image; and adjusting an open slit ratio of the barrier unit, based on the average luminance value of the disparity image.

The details of other embodiments are included in the detailed description and drawings.

Advantageous Effects

According to an embodiment of the present invention, there is one or more of the following effects.

First, the luminance or crosstalk value of the parallax barrier 3D image can be appropriately adjusted by controlling the open slit ratio of the parallax barrier to be inversely proportional to the luminance of the disparity image.

Secondly, when the parallax barrier 3D image is relatively dark, the user can view the parallax barrier 3D image of appropriate brightness by increasing the luminance of the parallax barrier 3D image.

Thirdly, when the noise of the parallax barrier 3D image is severe, the user can view the parallax barrier 3D image having a reduced noise by reducing the crosstalk value of the parallax barrier 3D image.

Fourth, the user can view the 3D image or 2D image of appropriate brightness by outputting a 3D image or a 2D image selected by the user to a partial area of the display unit selected by the user, and adjusting the open slit ratio of the barrier unit corresponding to each image.

The effects of the present invention are not limited to the effects mentioned above, and other effects not mentioned can be clearly understood by those skilled in the art from the description of the claims.

MODE FOR INVENTION

Figure 1A:
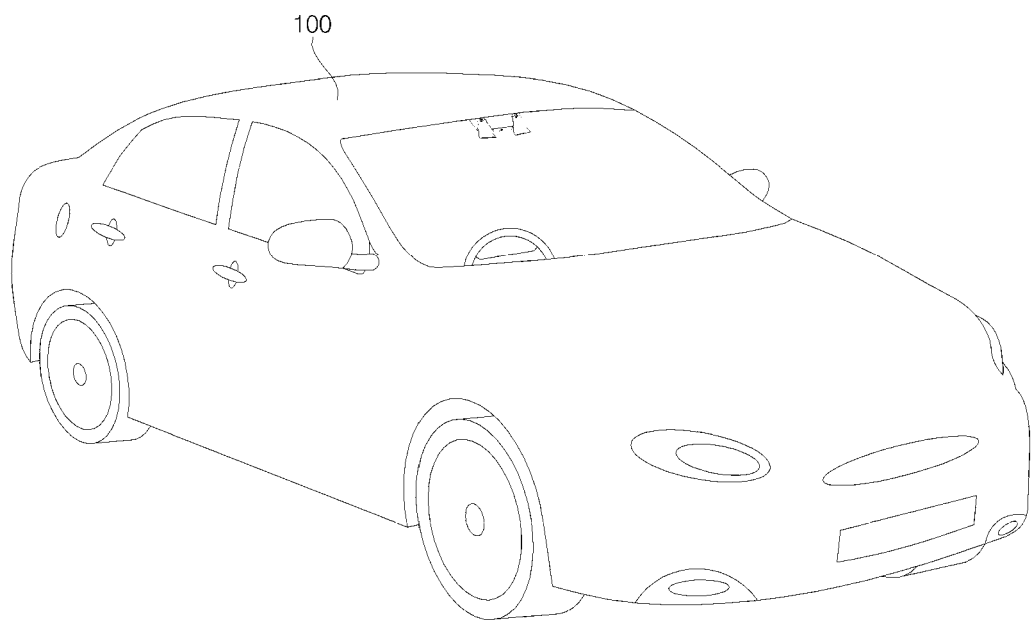
FIG. 1A and FIG. 1B are diagrams showing the exterior and interior of a vehicle according to an embodiment of the present invention.
Figure 1A:
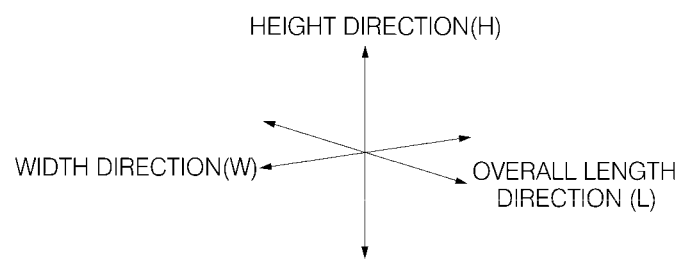

Hereinafter, preferred embodiments of the present invention will be described with reference to the accompanying drawings. In describing the present embodiment, the same designations and the same reference numerals are used for the same components, and further description thereof will be omitted. The term "module" used in this specification may mean, for example, a unit including one or a combination of at least two of hardware, software, or firmware. The "module" may be interchangeably used with terms such as a unit, a logic, a logical block, a component, or a circuit. The "module" may be a minimum unit or a part of integrally configured component. The "module" may be a minimum unit or a part for performing one or more functions. It will be understood that when an element is referred to as being "connected" or "connected" to another element, it can be directly connected or connected to the other element (e.g., third element) or intervening elements may be present. In contrast, when an element is referred to as being "directly connected" or "directly connected" to another element, there are no intervening elements present. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

A vehicle described in this specification may include an automobile, and a motorcycle. Hereinafter, the vehicle is described mainly based on the automobile.

The vehicle described in the present specification may include all of an internal combustion engine vehicle having an engine as a power source, a hybrid vehicle having an engine and an electric motor as a power source, an electric vehicle having an electric motor as a power source, and the like.

In the following description, the left side of vehicle means the left side in the traveling direction of vehicle, and the right side of vehicle means the right side in the traveling direction of vehicle.

Figure 1B:
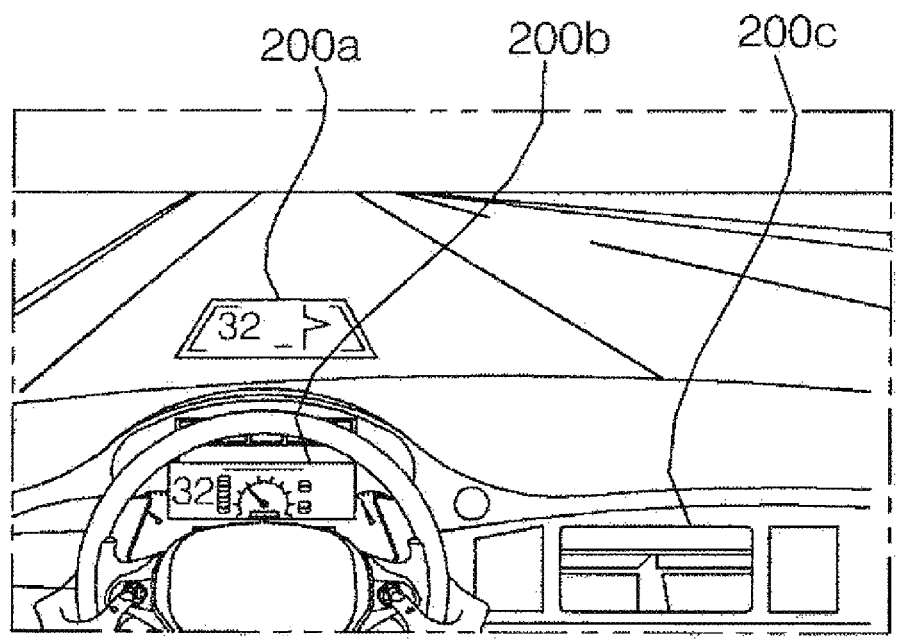

FIG. 1A and FIG. 1B are diagrams showing the exterior and interior of a vehicle according to an embodiment of the present invention.

Referring to FIG. 1A, a vehicle 100 may include a wheel rotated by a power source, and a steering input device for adjusting the traveling direction of the vehicle 100.

The vehicle 100 may include a display apparatus 200 for vehicle according to the present invention.

The display apparatus 200 for vehicle may output a parallax barrier 3D image.

According to an embodiment, the vehicle 100 may be an autonomous vehicle. In the case of the autonomous vehicle, it may be switched to an autonomous travel mode or a manual mode according to user input. When it is switched to the manual mode, the autonomous vehicle 100 may receive a steering input through a steering input device.

The overall length means a length from the front portion of the vehicle 100 to the rear portion, the width means a breadth of the vehicle 100, and the height means a length from the bottom of the wheel to the roof. In the following description, it is assumed that the overall length direction L is a direction used as a reference for the measurement of the overall length of the vehicle 100, the width direction W is a direction used as a reference for the measurement of the width of the vehicle 100, and the height direction H is a direction used as a reference for the measurement of the height of the vehicle 100.

Referring to FIG. 1B, the display apparatus 200 for vehicle according to the present invention may be provided inside a vehicle. The display apparatus 200 for vehicle may include at least one of a plurality of display apparatuses 200a, 200b, and 200c.

The display apparatus 200 for vehicle may include one of a head up display (HUD) 200a, a cluster 200b, and a center information display (CID) 200c, and may include all of the plurality of display apparatuses 200a, 200b, and 200c.

The display apparatus 200 for vehicle may output various information in parallax barrier 3D image format. A detailed description thereof will be described later.

Figure 2:
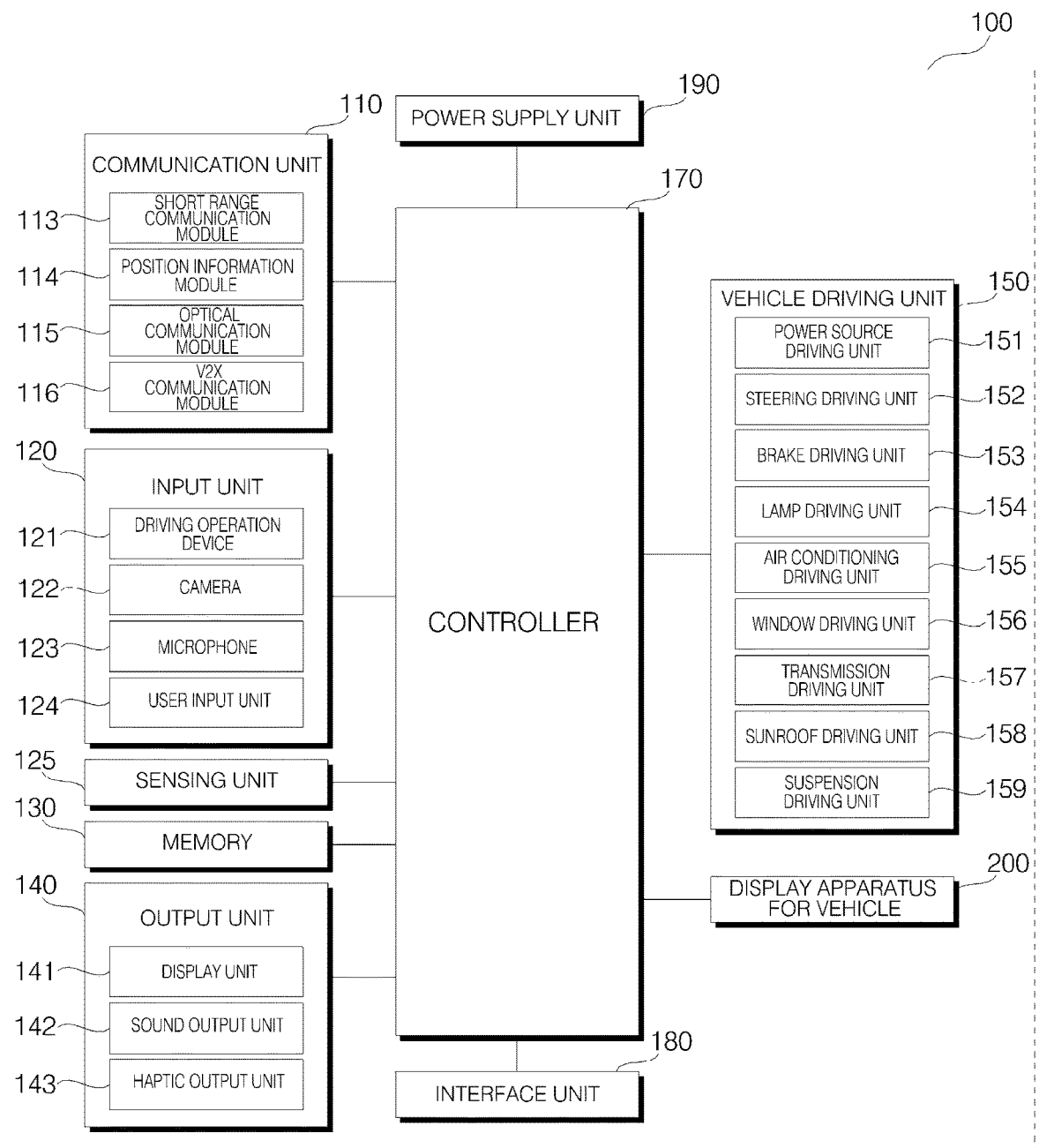
FIG. 2 is a block diagram for explaining a vehicle according to an embodiment of the present invention.

FIG. 2 is a block diagram for explaining a vehicle according to an embodiment of the present invention.

Referring to the drawing, the vehicle 100 may include a communication unit 110, an input unit 120, a sensing unit 125, a memory 130, an output unit 140, a vehicle driving unit 150, a controller 170, an interface unit 180, a power supply unit 190, and a display apparatus 200 for vehicle.

The communication unit 110 may include a short range communication module 113, a position information module 114, an optical communication module 115, and a V2X communication module 116.

The short range communication module 113 is used to achieve short range communication, and may support a short range communication by using at least one of a Bluetooth™, a Radio Frequency Identification (RFID), an Infrared Data Association (IrDA), a Ultra Wideband (UWB), a Near Field Communication (NFC), Wireless-Fidelity (Wi-Fi), Wi-Fi Direct, and Wireless Universal Serial Bus (Wireless USB).

The short range communication module 113 may form a wireless area network to perform short range communication between the vehicle 100 and at least one external device. For example, the short range communication module 113 may exchange data with a mobile terminal wirelessly. The short range communication module 113 may receive weather information and road traffic situation information (e.g., Transport Protocol Expert Group (TPEG)) from the mobile terminal. For example, when user is boarding the vehicle 100, the user's mobile terminal and the vehicle 100 may perform pairing with each other automatically or by application execution of the user.

The position information module 114 is a module for obtaining the position of the vehicle 100, and a representative example thereof is a Global Positioning System (GPS) module. For example, when the vehicle utilizes the GPS module, it may obtain the position of the vehicle by using a signal sent from a GPS satellite.

Meanwhile, according to an embodiment, the position information module 114 may be a component included in the sensing unit 125, not a component included in the communication unit 110.

The optical communication module 115 may include a light emitting unit and a light receiving unit.

The light receiving unit may convert the light signal into an electric signal and receive the information. The light receiving unit may include a photodiode (PD) for receiving light. The photodiode may convert light into an electrical signal. For example, the light receiving unit may receive information of forward vehicle through a light emitted from a light source included in a forward vehicle.

The light emitting unit may include at least one light emitting element for converting an electric signal into an optical signal. Here, the light emitting element is preferably a light emitting diode (LED). The light emitting unit may convert the electrical signal into the optical signal and transmit it to the outside. For example, the light emitting unit may emit the optical signal to the outside through the blinking of the light emitting element corresponding to a certain frequency. According to an embodiment, the light emitting unit may include a plurality of light emitting element arrays. According to an embodiment, the light emitting unit may be integrated with a lamp provided in the vehicle 100. For example, the light emitting unit may be at least one of a headlight, a tail light, a brake light, a turn signal light, and a side light. For example, the optical communication module 115 may exchange data with other vehicle through optical communication.

The V2X communication module 116 is a module for performing wireless communication with a server or other vehicle. The V2X module 116 includes a module capable of implementing inter-vehicle communication (V2V) or vehicle-to-infrastructure communication (V2I) protocols. The vehicle 100 may perform wireless communication with an external server and other vehicle through the V2X communication module 116.

The input unit 120 may include a driving operation device 121, a microphone 123, and a user input unit 124.

The driving operation device 121 receives a user input for driving the vehicle 100. The driving operation device 121 may include a steering input device, a shift input device, an acceleration input device, and a brake input device.

The steering input device receives a progress direction input of the vehicle 100 from the user. The steering input device is preferably implemented in a form of wheel so that steering input can be performed by rotation. According to an embodiment, the steering input device may be formed of a touch screen, a touch pad, or a button.

The shift input device receives inputs of parking (P), forward (D), neutral (N), and reverse (R) of the vehicle 100 from the user. The shift input device is preferably implemented in a form of lever. According to an embodiment, the shift input device may be formed of a touch screen, a touch pad, or a button.

The acceleration input device receives an input for acceleration of the vehicle 100 from the user. The brake input device receives an input for deceleration of the vehicle 100 from the user. The acceleration input device and the brake input device are preferably implemented in a form of pedal. According to an embodiment, the acceleration input device or the brake input device may be formed of a touch screen, a touch pad, or a button.

The microphone 123 may process an external sound signal into electrical data. The processed data may be utilized variously according to the function being performed in the vehicle 100. The microphone 123 may convert the user's voice command into electrical data. The converted electrical data may be transmitted to the controller 170.

Meanwhile, according to an embodiment, the camera 122 or the microphone 123 may be a component included in the sensing unit 125, not a component included in the input unit 120.

The user input unit 124 is used to receive information from a user. When the information is input through the user input unit 124, the controller 170 may control the operation of the vehicle 100 to correspond to the input information. The user input unit 124 may include a touch type input means or a mechanical type input means. According to an embodiment, the user input unit 124 may be disposed in one area of the steering wheel. In this case, the user may operate the user input unit 124 by using his/her finger while holding the steering wheel.

The sensing unit 125 senses various situations of the vehicle 100 or an external situation of the vehicle. To this end, the sensing unit 125 may include a collision sensor, a wheel sensor, a speed sensor, a tilt sensor, a weight sensor, a heading sensor, a yaw sensor, a gyro sensor, a position sensor, a vehicle forward/reverse sensor, a battery sensor, a fuel sensor, a tire sensor, a steering sensor for a steering wheel rotation, a vehicle interior temperature sensor, a vehicle interior humidity sensor, an ultrasonic sensor, an luminance sensor, an accelerator pedal position sensor, a brake pedal position sensor, and the like.

The sensing unit 125 may obtain a sensing signal based on vehicle collision information, vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle, vehicle exterior luminance, a pressure applied to the accelerator pedal, a pressure applied to the brake pedal, and the like.

The sensing unit 125 may further include an accelerator pedal sensor, a pressure sensor, an engine speed sensor, an air flow sensor (AFS), an air temperature sensor (ATS), a water temperature sensor WTS, a throttle position sensor (TPS), a TDC sensor, a crank angle sensor (CAS), and the like.

Meanwhile, the position information module 114 may be classified as a sub component of the sensing unit 125.

The sensing unit 125 may include an object sensing unit for sensing an object around the vehicle. Here, the object sensing unit may include a camera module, a radar, a lidar, and an ultrasonic sensor. In this case, the sensing unit 125 may sense a front object positioned in the front of the vehicle or a rear object positioned in the rear of the vehicle through the camera module, the radar, the lidar, or the ultrasonic sensor.

The sensing unit 125 may include a camera module. The camera module may include an external camera module for photographing the outside of the vehicle and an external camera module for photographing the interior of the vehicle.

The external camera module may include one or more cameras that photograph the outside of the vehicle 100. The external camera module may include an Around View Monitoring (AVM) device, a Blind Spot Detection (BSD) device, or a rear camera device.

The AVM device may synthesize a plurality of images obtained from a plurality of cameras and provide a vehicle around image to a user. The AVM device may synthesize a plurality of images and convert them into an image which is convenient for the user to watch. For example, the AVM device may synthesize a plurality of images and convert them into a top-view image.

For example, the AVM device may include first to fourth cameras. In this case, the first camera may be disposed around a front bumper, around a radiator grille, around an emblem, or around a windshield. The second camera may be disposed in a left side mirror, a left front door, a left rear door, and a left fender. The third camera may be disposed in a right side mirror, a right front door, a right rear door, or a right fender. The fourth camera may be disposed around a rear bumper, around the emblem, or around a license plate.

The BSD device detects an object from an image obtained from one or more cameras, and may output an alarm when it is determined that a possibility of collision with an object exists.

For example, the BSD device may include first and second cameras. In this case, the first camera may be disposed in the left side mirror, the left front door, the left rear door, or the left fender. The second camera may be disposed in the right side mirror, the right front, right rear door, or the right fender.

The rear camera may include a camera that obtains a vehicle rear image.

For example, the rear camera may be disposed around the rear bumper, around the emblem, or around the license plate.

Among the sensors (230 in FIG. 3) included in the display apparatus 200 for vehicle, the camera may be a camera included in any one of the AVM device, the BSD device, and the rear camera device provided in the vehicle 100.

The internal camera module may include one or more cameras that photograph the interior of the vehicle 100. The camera may acquire an image for a user.

The processor of the internal camera module may acquire an image of the user in the vehicle 100 and detect the number of passengers and the seat where the user is positioned. For example, the internal camera may detect the presence of a passenger and the boarding position.

The memory 130 is electrically connected to the controller 170. The memory 130 may store basic data for a unit, control data for controlling the operation of the unit, and input/output data. The memory 130 may be, in hardware, various storage devices such as ROM, RAM, EPROM, flash drive, hard drive, and the like. The memory 130 may store a program for processing or controlling the controller 170, and various data for the overall operation of the vehicle 100.

The output unit 140 is implemented to output information processed by the controller 170, and may include a sound output unit 142 and a haptic output unit 143.

The sound output unit 142 converts the electric signal transmitted from the controller 170 into an audio signal and outputs the audio signal. For this purpose, the sound output unit 142 may include a speaker, or the like. It is also possible for the sound output unit 142 to output a sound corresponding to the operation of the user input unit 724.

The haptic output unit 143 generates a tactile output. For example, the haptic output unit 143 may operate to vibrate a steering wheel, a seat belt, and a seat so that the user may recognize the output.

The vehicle driving unit 150 may control the operation of various devices of vehicle.

The vehicle driving unit 150 may include a power source driving unit 151, a steering driving unit 152, a brake driving unit 153, a lamp driving unit 154, an air conditioning driving unit 155, a window driving unit 156, an air bag driving unit 157, a sunroof driving unit 158, and a suspension driving unit 159.

The power source driving unit 151 may perform electronic control of a power source in the vehicle 100.

For example, when a fossil fuel-based engine (not shown) is a power source, the power source driving unit 151 may perform electronic control of the engine. Thus, the output torque of the engine, and the like may be controlled. When the power source driving unit 151 is an engine, the speed of the vehicle may be limited by limiting the engine output torque under the control of the controller 170.

As another example, when an electric-based motor (not shown) is a power source, the power source driving unit 151 may perform control of the motor. Thus, the rotation speed, torque, and the like of the motor may be controlled.

The steering driving unit 152 may perform electronic control of the steering apparatus in the vehicle 100. Thus, the traveling direction of the vehicle may be changed.

The brake driving unit 153 may perform electronic control of a brake apparatus (not shown) in the vehicle 100. For example, it is possible to reduce the speed of the vehicle 100 by controlling the operation of the brakes disposed in the wheel. As another example, it is possible to adjust the traveling direction of the vehicle 100 to the left or right by differently operating the brakes respectively disposed in the left wheel and the right wheel.

The lamp driving unit 154 may control the turn-on/turn-off of the lamps disposed inside and outside the vehicle. In addition, the intensity, direction, and the like of the light of the lamp may be controlled. For example, it is possible to perform control of a direction indicating lamp, a brake lamp, and the like.

The air conditioning driving unit 155 may perform electronic control for an air conditioner (not shown) in the vehicle 100. For example, when the temperature inside the vehicle is high, the air conditioner may be operated to control the cooling air to be supplied into the vehicle.

The window driving unit 156 may perform electronic control of a window apparatus in the vehicle 100. For example, it is possible to control the opening or closing of left and right windows in the lateral of the vehicle.

The airbag driving unit 157 may perform electronic control for the airbag apparatus in the vehicle 100. For example, in case of danger, the airbag can be controlled to inflate.

The sunroof driving unit 158 may perform electronic control of a sunroof apparatus (not shown) in the vehicle 100. For example, the sunroof driving unit 158 may control the opening or closing of the sunroof.

The suspension driving unit 159 may perform electronic control of a suspension apparatus (not shown) in the vehicle 100. For example, when there is unevenness on the road surface, the suspension driving unit 159 may control the suspension apparatus to reduce the vibration of the vehicle 100.

Meanwhile, according to an embodiment, the vehicle driving unit 150 may include a chassis driving unit. Here, the chassis driving unit may include a steering driving unit 152, a brake driving unit 153, and a suspension driving unit 159.

The controller 170 may control the overall operation of each unit in the vehicle 100. The controller 170 may be referred to as an Electronic Controller (ECU).

The controller 170 may be implemented in hardware by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic unit for performing other functions.

The interface unit 180 may serve as a channel to various kinds of external devices connected to the vehicle 100. For example, the interface unit 180 may include a port that can be connected to a mobile terminal, and may be connected to the mobile terminal through the port. In this case, the interface unit 180 may exchange data with the mobile terminal.

Meanwhile, the interface unit 180 may serve as a channel for supplying electrical energy to the connected mobile terminal. When the mobile terminal is electrically connected to the interface unit 180, the interface unit 180 may provide the mobile terminal with electric energy supplied from a power supply unit 190 under the control of the controller 170.

The power supply unit 190 may supply power necessary for operation of respective components under the control of the controller 170. The controller 170 may receive power from a battery (not shown) or the like inside the vehicle.

Hereinafter, the display apparatus 200 for vehicle will be described in detail.

Figure 3:
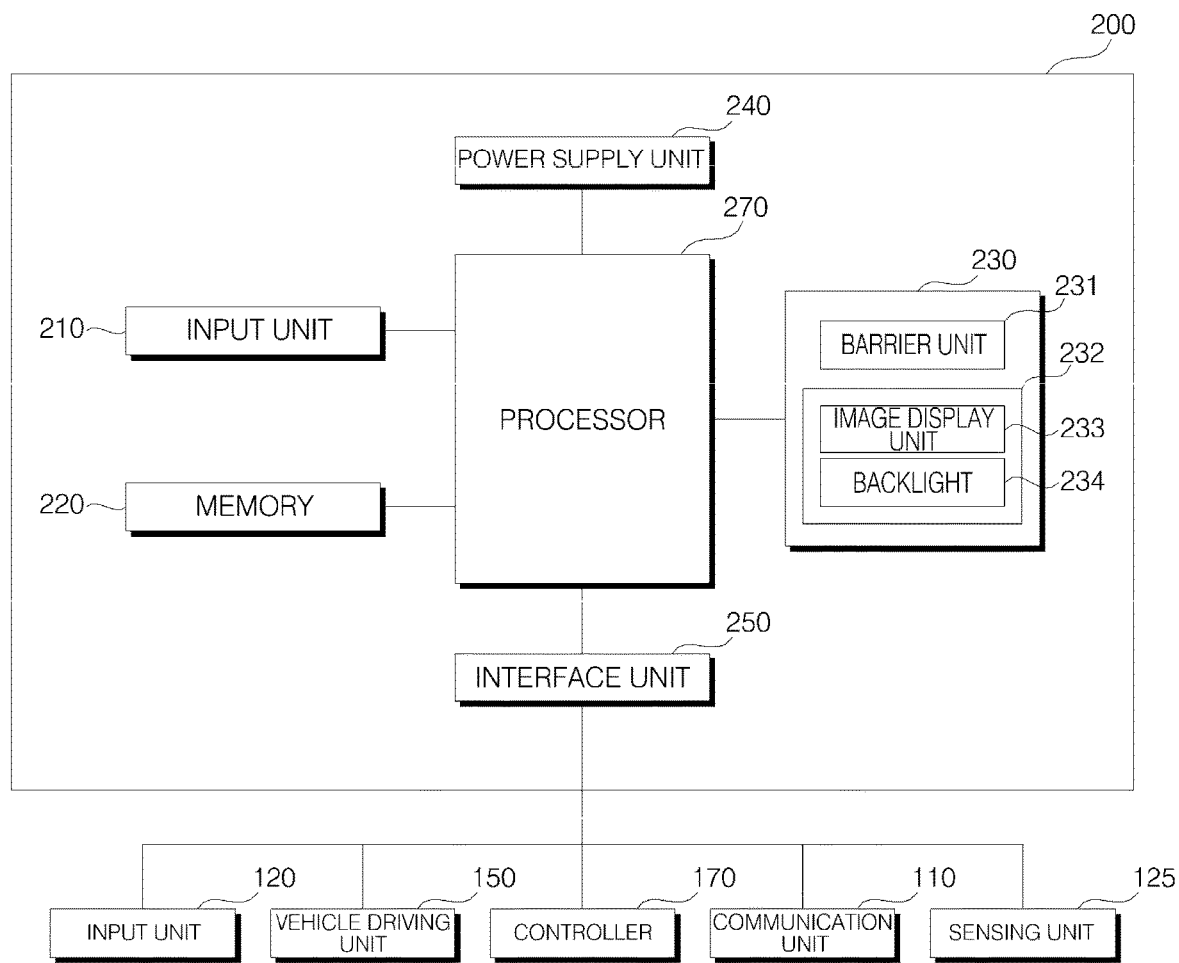
FIG. 3 is a diagram for explaining a display apparatus for vehicle according to an embodiment of the present invention.
Figure 4A:
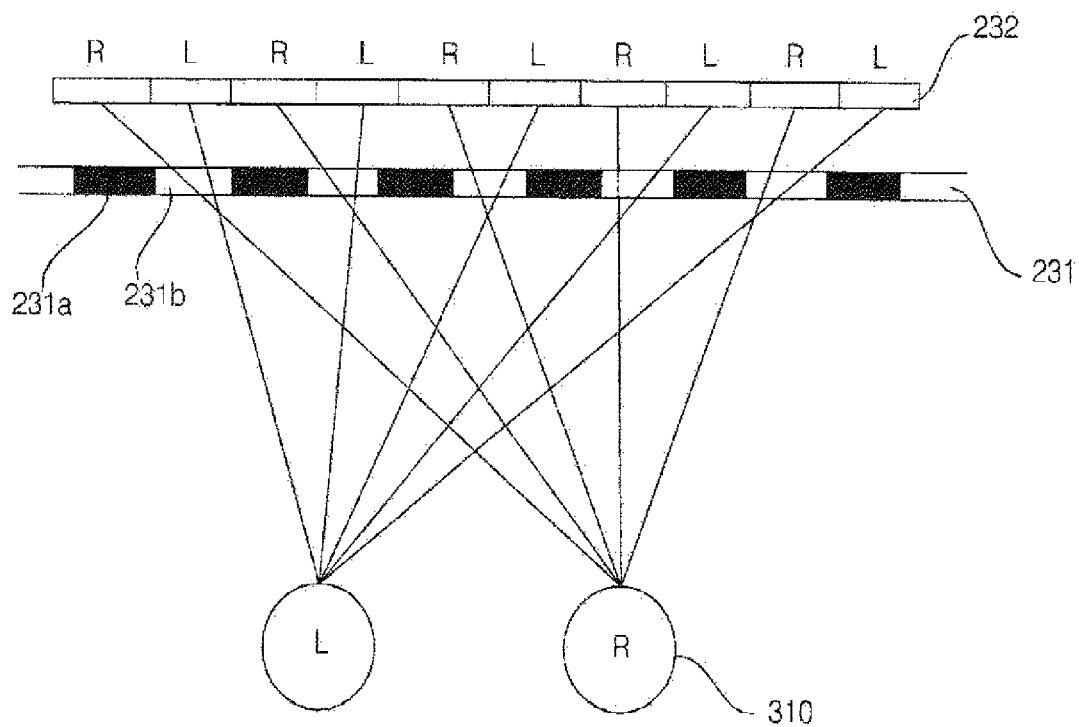
FIG. 4A and FIG. 4B are diagrams for explaining a parallax barrier 3D image outputted by a display apparatus for vehicle according to an embodiment of the present invention.
Figure 4B:
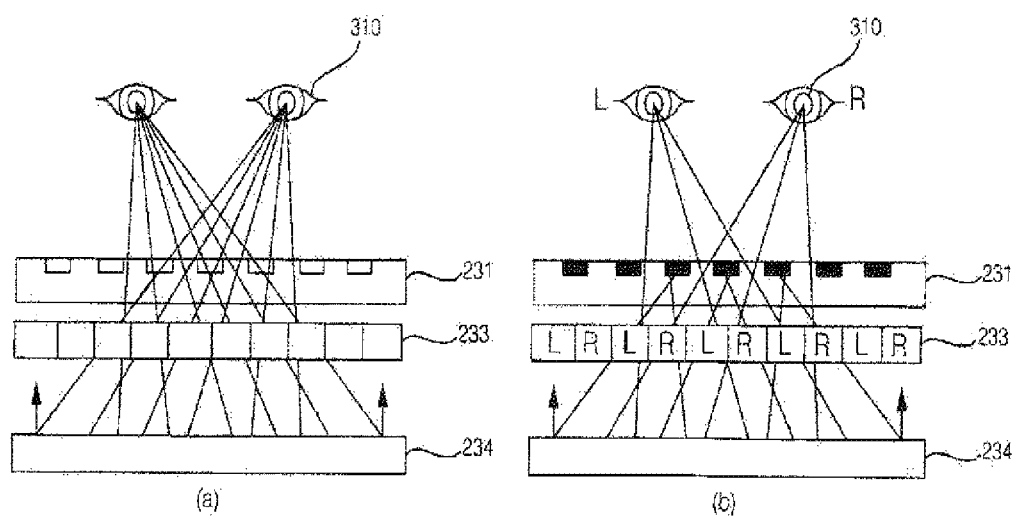

FIG. 3 is a diagram for explaining a display apparatus for vehicle according to an embodiment of the present invention. FIG. 4A and FIG. 4B are diagrams for explaining a parallax barrier 3D image outputted by a display apparatus for vehicle according to an embodiment of the present invention.

Referring to FIG. 3, the display apparatus 200 for vehicle may include an input unit 210, a memory 220, a display unit 230, a power supply unit 240, an interface unit 250, and a processor 270. The processor 270 may be electrically connected to each unit of the display apparatus 200 for vehicle, and may control the operation of the display apparatus 200 for vehicle by controlling each unit. A detailed description of each unit will be described later.

The display apparatus 200 for vehicle may output a parallax barrier 3D image. The display apparatus 200 for vehicle may output the parallax barrier 3D image including various graphic objects through the display unit 230.

The parallax barrier 3D image is a 3D image that allows a user to feel a three-dimensional effect even if the user views the image without any additional equipment such as glasses. The parallax barrier 3D image is displayed on the display unit 230 when a parallax barrier is implemented in a barrier unit 231 and a disparity image is outputted to an image output unit 232. The disparity image is a combination image of an L image and an R image. In the case where only the L image is seen by a left eye of the user and only the R image is seen by the right eye due to the parallax barrier implemented on the disparity image, the user can see the 3D image having a three-dimensional effect. Hereinafter, the parallax barrier 3D image will be described with reference to FIG. 4A and FIG. 4B.

Referring to FIG. 4A, the processor 270 may output the parallax barrier 3D image through the barrier unit 231 and the image output unit 232.

The barrier unit 231 is disposed between the image output unit 232 and the user's line of sight 310.

The processor 270 implements a parallax barrier in the barrier unit 231. The processor 270 outputs a disparity image corresponding to the parallax barrier to the image output unit 232. At this time, the parallax barrier 3D image is displayed on the display unit 230.

The parallax barrier is formed of at least one opaque block section 231a and at least one transparent slit section 231b.

Since the slit section 231b is transparent, light can pass through it. Accordingly, the user can see the image displayed on the image output unit 232 through the slit section 231b.

Since the block section 231a is opaque, light cannot pass through it. Accordingly, the user cannot see a portion of the image displayed on the image output unit 232 covered by the block section 231a.

The disparity image is a combination of an R image and an L image. The R image is an image to be seen by the left eye of the user. The L image is an image to be seen by the right eye of the user.

The parallax barrier allows the left eye L of the user to see only the L image and allows the right eye R of the user to see only the R image. Accordingly, a parallax barrier 3D image having a three-dimensional effect can be seen by the user.

The combination form of the R image and the L image depends on the type of the parallax barrier implemented by the barrier unit 231.

The types of parallax barrier include a vertical parallax barrier in which a block section and a slit section are formed in a vertical direction, a pin hole parallax barrier in which a slit section is formed of a plurality of pinhole, a step parallax barrier in which resolution degradation is equalized horizontally and vertically, and a time division parallax barrier in which two barrier units are disposed to be engaged with each other and a time-division method is applied.

Since the combination form of the R image and the L image is changed according to the type of the parallax barrier, the disparity image outputted to the image output unit 232 is changed.

Referring to FIG. 4B, the operations of the barrier unit 231 and an image display unit 233 are differentiated depending on whether a 2D image is outputted, or a parallax barrier 3D image is outputted.

Referring to FIG. 4B(a), when a 2D image is outputted to the display unit 230, the processor 270 controls all the sections of the barrier unit 231 to be a slit section through which the light passes. Thus, the entire barrier unit 231 becomes transparent.

The processor 270 outputs a 2D image to the image display unit 233. Accordingly, the user recognizes the image outputted from the display unit 230 as a 2D image.

Referring to FIG. 4B(b), when the parallax barrier 3D image is outputted from the display unit 230, the processor 270 controls a specific section of the barrier unit 231 to be an opaque block section. Thus, a remaining section excluding the block section becomes a slit section, and a parallax barrier is implemented in the barrier unit 231.

The processor 270 outputs the disparity image corresponding to the parallax barrier to the image display unit 233. Accordingly, the left eye of the user can see only the L image, and the right eye can see only the R image. The user recognizes the image outputted to the display unit 230 as a 3D image.

In the structure of the display unit 230, the barrier unit 231 may be disposed in the upper end of the image output unit 232. In addition, the barrier unit 231 may be disposed between the image display unit 233 and a backlight 234.

Hereinafter, each unit of the display apparatus 200 for vehicle will be described in detail.

The input unit 210 may receive a user's input to the display apparatus 200 for vehicle. The input unit 210 may be electrically connected to the processor 270. The input unit 210 may generate a signal corresponding to the received input and provide it to the processor 270. The processor 270 may control the display apparatus 200 for vehicle according to an input to the display apparatus 200 for vehicle received through the input unit 210. The input unit 210 may receive an activation input for various functions of the display apparatus 200 for vehicle.

The input unit 210 may include at least one of a mechanical input device, a touch type input device, and a wireless input device.

The mechanical input device may include a button, a lever, a jog wheel, a switch, and the like. The touch type input device may include at least one touch sensor. The touch input device may be implemented as a touch screen. In this case, the touch input device may be layered with the display unit 260 to form a touch screen. The wireless input device may receive user input wirelessly.

The input unit 210 may include a camera and a microphone (not shown). The camera may acquire an image and generate image data. The microphone may generate a sound data which is an electrical signal by using an input sound.

The input unit 210 may provide the processor 270 with at least one of the generated image data and sound data. The processor 270 may convert the image data and the sound data received through the input unit 210 to a user's input to the display apparatus 200 for vehicle. For example, the processor 270 may execute a specific function of the display apparatus 200 for vehicle in response to a voice inputted through the microphone.

The input unit 210 may receive a user input. The input unit 210 may receive a user input for selecting one of a plurality of image areas included in the image output unit 232. The input unit 210 may receive a user input for selecting an image outputted to the image output unit 232 or the image area. The processor 270 may output the image selected based on the user input to the image area selected based on the input of the user among the plurality of image areas.

The memory 220 may store various data for overall operation of the display apparatus 200 for vehicle, such as a program for processing or controlling the processor 270.

The memory 220 may be electrically connected to the processor 270. The memory 220 may store various data or delete stored data, under the control of the processor 270.

In the memory 220, a parallax barrier 3D image or a 2D image may be stored. The processor 270 may output one of the images stored in the memory 220 to the display unit 230 in response to a user input received by the input unit 210.

The memory 220 may be, in terms of hardware, various storage devices such as ROM, RAM, EPROM, flash drive, hard drive, and the like. The memory 220 may be included as a sub-configuration of the processor 270, according to an embodiment.

The display unit 230 may display various information graphically. For example, the display unit 230 may display vehicle-related information. The vehicle-related information may include at least one of vehicle control information for direct control of the vehicle, vehicle driving assistance information for a driving guide to a vehicle user, vehicle state information indicating the current state of vehicle, and vehicle operation information related to vehicle operation.

The display unit 230 may include at least one of a liquid crystal display (LCD), a thin film transistor-liquid crystal display (TFT LCD), an organic light-emitting diode (OLED), a flexible display, a 3D display, and an e-ink display.

The display unit 230 may be a touch screen having a dual-layer structure with a touch sensor, or integrally formed. When the display unit 230 is a touch screen, the display unit 230 may provide an input interface to the vehicle 100 and may provide an output interface to the vehicle 100. In this case, the display unit 230 may include a touch sensor that detects a touch for the display unit 230 so that a control command can be received by a touch method. By using this, when a touch is accomplished for the display unit 230, the touch sensor detects the touch, and the processor 270 may generate a control command corresponding to the touch based on the detection of the touch. The content inputted by the touch method may be a character or number, an instruction in various modes, a menu item which can be designated, or the like. Meanwhile, the display unit 230 may include a cluster for allowing the user to verify the vehicle state information or the vehicle operation information. The cluster may be positioned on a dashboard. In this case, the user may verify the information displayed on the cluster while maintaining the line of sight ahead of the vehicle.

Meanwhile, according to the embodiment, the display unit 230 may be a head up display (HUD). When the display unit 230 is the HUD, information may be outputted through a transparent display provided in the windshield or information may be outputted through a projection module that projects the image to the windshield.

The transparent display may have a certain transparency, and display a certain screen. In order to have transparency, the transparent display may include at least one of a transparent thin-film electroluminescent (TFEL), a transparent organic light-emitting diode (OLED), a transparent liquid crystal display, a transmissive transparent display, and a transparent light-emitting diode (LED) display. The transparency of the transparent display can be adjusted.

The display unit 230 may output the parallax barrier 3D image. The display unit 230 may include the barrier unit 231 and the image output unit 232. The processor 270 may output the 2D image or the parallax barrier 3D image through the barrier unit 231 and the image output unit 232. The parallax barrier 3D image is a 3D image that can be viewed without separate equipment such as glasses.

The barrier unit 231 may be implemented of a transparent liquid crystal.

The barrier unit 231 may be a stripe barrier configured in a striped pattern in the vertical direction. When the barrier unit 231 is a stripe barrier, a channel included in the barrier unit 231 may be a long bar shape in the vertical direction, and may have a shape in which a plurality of channels are horizontally disposed. The barrier unit 231 may be a pinhole barrier, a stepwise barrier, a slanted barrier, or the like depending on the shape and configuration of the channel. Hereinafter, the description will be limited to the case where the barrier unit 231 is a stripe barrier configured in the form of stripes in the vertical direction.

The barrier unit 231 may be configured in such a manner that a plurality of channels are implemented in a transparent liquid crystal. Accordingly, the barrier unit 231 may include a plurality of channels. One channel may be in the form of a thin bar. For example, the width of one channel may be about 8.44 um.

The barrier unit 231 may be electrically connected to the processor 270. The processor 270 may control the barrier unit 231.

The plurality of channels included in the barrier unit 231 may be electrically connected to the processor 270, respectively. The plurality of channels of the barrier unit 231 may receive a control signal from the processor 270 individually. The plurality of channels of the barrier unit 231 may be transparent or opaque individually, depending on the control signal individually provided by the processor 270.

A section of the barrier unit 231 in which the channel is transparent may be referred to as a slit section. A section of the barrier unit 231 in which the channel is opaque may be referred to as a block section.

The slit section is a transparent section through which light can pass. Since the slit section passes the light of the image displayed on the image output unit 232, the user can see the image displayed on the image output unit 232 through the slit section.

The block section is an opaque section through which light cannot pass. The block section prevents the image displayed on the image output unit 232 from being seen by the user.

The open slit ratio is a ratio occupied by the slit section in the barrier unit 231. For example, if the open slit ratio of the barrier unit 231 is 50%, the slit section is 50% and the block section is 50% in the barrier unit 231.

The barrier unit 231, which is implemented of a liquid crystal and has variable slit section and block section, is called a switchable parallax barrier.

The barrier unit 231 may implement a parallax barrier. The parallax barrier may include at least one block section and at least one slit section. The parallax barrier may be implemented in such a manner that the ratio of the block section and the slit section is the same, and the block section and the slit section are alternately disposed.

The parallax barrier may cause a binocular parallax of a user who views the image displayed on the image output unit 232.

The binocular parallax means that the portion seen through the left eye of the user is different from the portion seen through the right eye.

That is, when the user views the image displayed on the image output unit 232, the parallax barrier makes the portion seen by the left eye of the user to be different from the portion seen by the right eye of the user.

Since the barrier unit 231 is spaced apart from the image output unit 232 by a certain distance, the binocular parallax may occur when the user views the image displayed on the image output unit 232 through the parallax barrier.

The parallax barrier 3D image is a 3D image that allows the user to feel a three-dimensional effect, when the left eye of the user can see only the L image and the right eye of the user can see only the R image, due to the parallax barrier.

The parallax barrier may include a vertical parallax barrier in which a block section and a slit section are formed in a vertical direction, a pinhole parallax barrier in which a slit section is formed of a plurality of pinhole, a step parallax barrier in which resolution degradation is equalized horizontally and vertically, and a time division parallax barrier in which two barriers are disposed to be engaged with each other and a time-division method is applied. The disparity image outputted to the image output unit 232 may be changed according to the type of the parallax barrier.

The disparity image or 2D image may be outputted to the image output unit 232.

The disparity image corresponding to the parallax barrier of the barrier unit 231 may be output to the image output unit 232.

The disparity image is an image formed by combining an R image seen by the right eye of the user and an L image seen by the left eye of the user. The R image is an image to be seen by the right eye of the user. The L image is an image to be seen by the left eye of the user.

The R image can be seen by the right eye of the user through the slit section of the parallax barrier. Due to the block section of the parallax barrier, the L image is not seen by the right eye of the user.

The L image can be seen by the left eye of the user through the slit section of the parallax barrier. Due to the block section of the parallax barrier, the L image is not seen by the left eye of the user.

That is, due to the parallax barrier, the user can see only the L image by the left eye and see only the R image by the right eye. In this case, the user can see a three-dimensional effect by viewing the parallax barrier 3D image displayed on the display unit 230.

Since the combination form of the R image and the L image in the disparity image is changed according to the type of the parallax barrier implemented by the barrier unit 231, if the type of the parallax barrier is changed, the disparity image is also changed.

The image output unit 232 may be one of an LCD, a TFT LCD, an LED, an OLED, and an active matrix organic light-emitting diode (AMOLED). When the image output unit 232 is the OLED or AMOLED, the image output unit 232 may be implemented by only the image display unit 233 without the backlight 234.

The image output unit 232 may include the image display unit 233 and the backlight 234.

The image display unit 233 may display the 2D image or the disparity image. The image display unit 233 may be a liquid crystal panel. If the image output 232 is OLED or AMOLED, the backlight 234 may not exist.

The image display unit 233 may be electrically connected to the processor 270. The image display unit 233 may display a 2D image or a disparity image corresponding to a signal provided by the processor 270.

The backlight 234 may emit light in the direction in which the image display unit 233 is positioned. The backlight 234 may include at least one light emitting device.

The backlight 234 may be electrically connected to the processor 270. The backlight 234 may adjust the brightness of the emitted light in response to a signal provided by the processor 270.

The backlight 234 may be an LED. If the backlight 234 is the LED, the brightness of the backlight 234 may be adjusted according to a PWM method.

When the brightness of the backlight 234 is adjusted by the PWM method and the duty ratio of the backlight 234 increases, the brightness of the backlight 234 increases and the brightness of the image displayed on the display 230 increases do. When the duty ratio of the backlight 234 decreases, the brightness of the backlight 234 decreases and the luminance of the image displayed on the display unit 230 decreases.

The power supply unit 240 may provide power to processor 270 to enable processor 270 to operate. The display apparatus 200 for vehicle may include a means for supplying power separately from the power supply unit 240.

The interface unit 250 may perform data communication with the controller 170, the sensing unit 125, the input unit 120, the vehicle driving unit 150, the communication unit 110, and the like in the vehicle 100 by wire communication or wireless communication.

The interface unit 250 may provide various received information to the processor 270 or may transmit a signal, information, or data processed or generated by the processor 270 to the outside. The processor 270 may output various information provided from the interface unit 250 to the display unit 230.

The interface unit 250 may receive navigation information by the data communication with the controller 170 or a separate navigation device. The navigation information may include set destination information, route information according to the destination, map information related to traveling of vehicle, current position information of vehicle, and position information of a vehicle on the road. The processor 270 may receive the navigation information from the interface unit 250 and output the navigation information to the display unit 230.

The interface unit 250 may receive sensor information from the controller 170 or the sensing unit 125.

The sensor information may include at least one of vehicle direction information, vehicle position information (GPS information), vehicle angle information, vehicle speed information, vehicle acceleration information, vehicle tilt information, vehicle forward/backward information, battery information, fuel information, tire information, vehicle lamp information, vehicle internal temperature information, vehicle internal humidity information, and information on rain.

The sensor information may include at least one of a heading sensor, a yaw sensor, a gyro sensor, a position module, a vehicle forward/backward sensor, a wheel sensor, a vehicle speed sensor, a vehicle body inclination detecting sensor, a battery sensor, a fuel sensor, a tire sensor, a steering sensor for steering wheel rotation, a vehicle internal temperature sensor, a vehicle internal humidity sensor, a rain sensor, and the like. Meanwhile, the position module may include a GPS module for receiving GPS information. Among the sensor information, the vehicle direction information, the vehicle position information, the vehicle angle information, the vehicle speed information, the vehicle tilt information, and the like relating to the vehicle traveling may be referred to as vehicle traveling information.

The processor 270 may be electrically connected to various units of the display apparatus 200 for vehicle to perform overall control.

The processor 270 may output the parallax barrier 3D image to the display unit 230. The processor 270 may output the parallax barrier 3D image to the display unit 230, by implementing the parallax barrier in the barrier unit 231 and outputting the disparity image to the image output unit 232.

The parallax barrier 3D image is a 3D image that can be viewed without separate equipment such as glasses. The disparity image outputted to the image output unit 232 is an image obtained by combining the L image and the R image.

The parallax barrier implemented in the barrier unit 231 may prevent a specific portion of the image outputted to the image output unit 232 from being seen by the user's eye. The parallax barrier allows the user's left eye to see only the L image and allows the user's right eye to see only the R image.

When only the L image is seen by the left eye of the user of the display apparatus 200 for vehicle and only the R image is seen by the right eye of the user, it can be seen that the disparity image and the parallax barrier are disposed to correspond. In this case, the user viewing the parallax barrier 3D image outputted to the display apparatus 200 for vehicle may feel a three-dimensional effect.

The processor 270 may adjust the open slit ratio of the barrier unit 231 based on the average luminance value of the disparity image.

The average luminance value of the disparity image is an average value of the luminance of a plurality of pixels included in the image output unit 232, when the disparity image is outputted. The image output unit 232 may include a plurality of pixels. When the disparity image is outputted to the image output unit 232, the plurality of pixels may have their own luminance respectively. A detailed description thereof will be described later with reference to FIG. 8.

The open slit ratio is a ratio of the transparent slit section that occupies in the entire area of the barrier unit 231. For example, when there is no opaque block section in the barrier unit 231, there is only a transparent slit section in the barrier unit 231. Hence, the open slit ratio is 100%.

The processor 270 adjusts the open slit ratio to be in inverse proportion to the average luminance value of the disparity image to increase the luminance of the parallax barrier 3D image or reduce the crosstalk value of the parallax barrier 3D image.

The relationship between the open slit ratio and the luminance of the parallax barrier 3D image and the relationship between the open slit ratio and the crosstalk value of the parallax barrier 3D image will be described below with reference to FIGS. 4C and 4D.

Figure 4C:
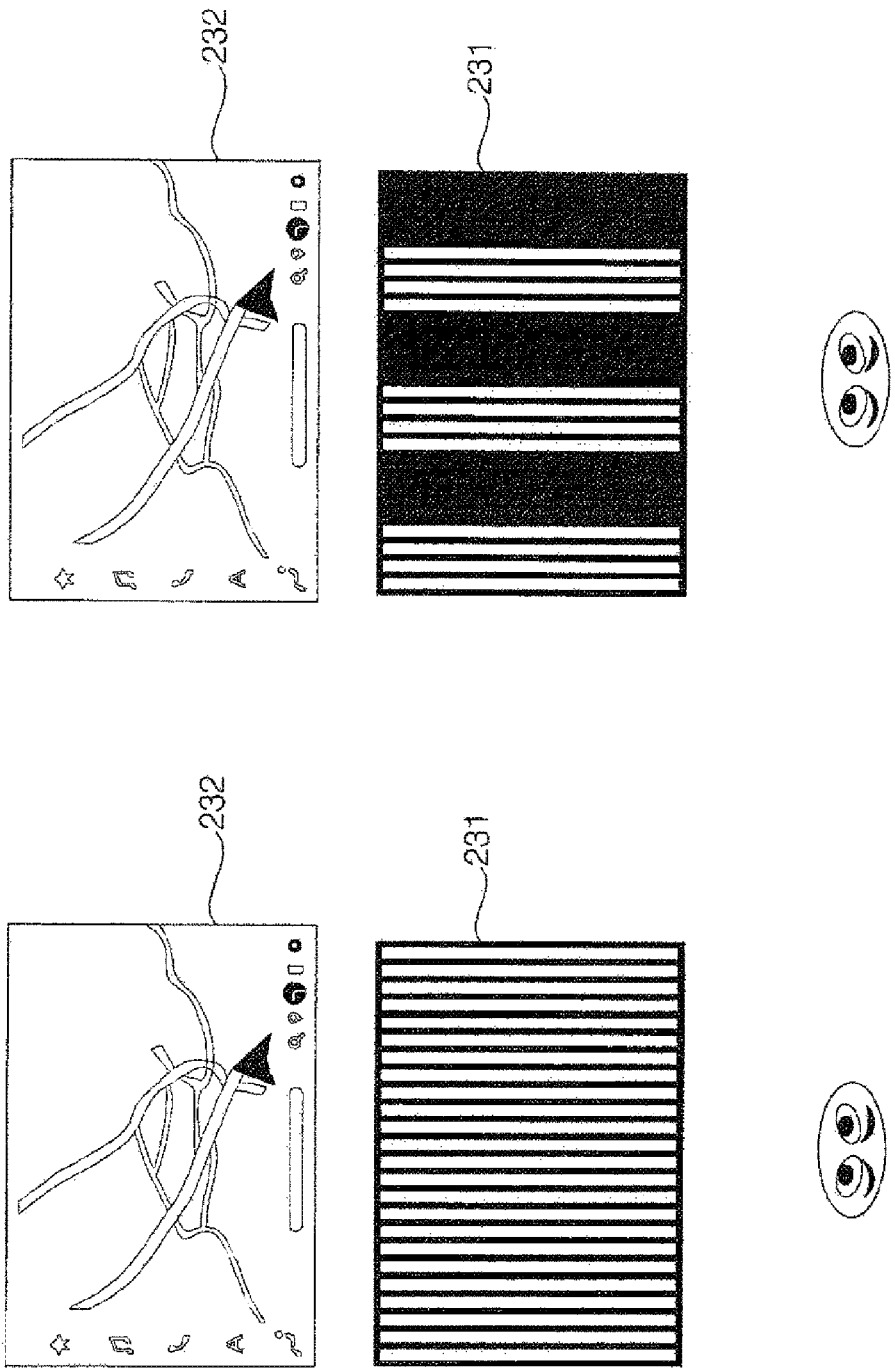
FIG. 4C is a diagram for explaining the relationship between an open slit ratio and a luminance of a parallax barrier 3D image.

FIG. 4C is a diagram for explaining the relationship between an open slit ratio and a luminance of a parallax barrier 3D image.

Referring to FIG. 4C, the barrier unit 231 may be disposed between the user's eyes and the image output unit 232.

Referring to FIG. 4C(a), when the open slit ratio of the barrier unit 231 is 100%, the barrier unit 231 may be entirely transparent. Accordingly, since the light of the image outputted to the image output unit 232 is not blocked, the luminance of the image outputted to the display unit 230 is not decreased.

Referring to FIG. 4C(b), when the open slit ratio of the barrier unit 231 is 50%, the ratio of the opaque block section that occupies in the barrier unit 231 is 50%. Accordingly, since the light of the image outputted to the image output unit 232 is blocked, the luminance of the display unit 230 may be decreased.

The open slit ratio of the barrier unit 231 may be proportional to the luminance of the image outputted to the display unit 230. Accordingly, the processor 270 may reduce the luminance of the parallax barrier 3D image by reducing the open slit ratio of the barrier unit 231. In addition, the processor 270 may increase the luminance of the parallax barrier 3D image by increasing the open slit ratio of the barrier unit 231.

Figure 4D:
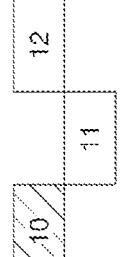
FIG. 4D is a diagram for explaining the relationship between an open slit ratio and a crosstalk value of a parallax barrier 3D image.

FIG. 4D is a diagram for explaining the relationship between an open slit ratio and a crosstalk value of a parallax barrier 3D image.

When a specific pattern is outputted only to the L image of the disparity image and a parallax barrier is implemented in the barrier unit 231, the crosstalk value of the parallax barrier 3D image is a value indicating the degree to which the specific pattern is displayed to the R image. For example, when the crosstalk value of the parallax barrier 3D image is 3%, a specific pattern outputted only to the L image may be displayed in the R image by about 3%. In theory, when a specific pattern is outputted only to the L image of the disparity image and a parallax barrier is implemented in the barrier unit 231, the specific pattern should not be displayed in the R image. However, due to the refraction of light, the parallax barrier, and the disparity image error, the crosstalk of the parallax barrier 3D image may occur.

Referring to FIG. 4D, it can be seen that as the open slit ratio increases, the crosstalk value increases.

When the open slit ratio is 33%, an opaque block section is formed from channel 4 to channel 9 of the barrier unit 231, and the crosstalk value of the parallax barrier 3D image may be 3%.

When the open slit ratio is 42%, an opaque block section is formed from a channel 4 to a channel 8 of the barrier unit 231, and the crosstalk value of the parallax barrier 3D image may be 4%.

When the open slit ratio is 50%, an opaque block section is formed from a channel 5 to a channel 8 of the barrier unit 231, and the crosstalk value of the parallax barrier 3D image may be 5%.

When the open slit ratio is 58%, an opaque block section is formed from the channel 5 to the channel 8 of the barrier unit 231, and the crosstalk value of the parallax barrier 3D image may be 10%.

The open slit ratio of the barrier unit 231 may be proportional to the crosstalk value of the parallax barrier 3D image. The processor 270 may increase the crosstalk value of the parallax barrier 3D image by increasing the open slit ratio of the barrier unit 231. The processor 270 may increase the crosstalk value of the parallax barrier 3D image by increasing the open slit ratio of the barrier unit 231.

Referring to FIGS. 4C and 4D, when the open slit ratio of the barrier unit 231 is increased, the luminance of the parallax barrier 3D image and the crosstalk value of the parallax barrier 3D image may be increased. When the open slit ratio of the barrier unit 231 is decreased, the luminance of the parallax barrier 3D image and the crosstalk value of the parallax barrier 3D image may be reduced.

Accordingly, the luminance of the disparity image outputted to the image output unit 232 may be proportional to the crosstalk value of the parallax barrier 3D image outputted to the display unit 230.

When the luminance of the parallax barrier 3D image is decreased, the user can feel that the brightness of the parallax barrier 3D image is dark. In this case, since the crosstalk value of the parallax barrier 3D image is reduced, the noise of the parallax barrier 3D image felt by the user may also be reduced.

When the crosstalk value of the parallax barrier 3D image is increased, the user may feel that the noise of the parallax barrier 3D image is severe. In this case, since the luminance of the parallax barrier 3D image is increased, the noise of the parallax barrier 3D image that the user feels may also be reduced.

Accordingly, the open slit ratio should be appropriately adjusted so that the user who views the parallax barrier 3D image does not feel that the parallax barrier 3D image is dark and does not feel that the noise of the parallax barrier 3D image is severe.

The processor 270 may increase the luminance of the parallax barrier 3D image by increasing the open slit ratio based on the difference between a first set luminance value and an average luminance value of the disparity image, when the average luminance value of the disparity image is equal to or less than the first set luminance value.

The first set luminance value may correspond to a minimum brightness required for the user to view the parallax barrier 3D image. The first set luminance value may be a value determined by an experiment. The processor 270 may adjust the first set luminance value in response to the user input. The processor 270 may store the first set luminance value in the memory 220.

When the average luminance value of the disparity image is equal to or less than the first set luminance value, the user can feel that the parallax barrier 3D image is dark. Therefore, the processor 270 may increase the open slit ratio based on a difference between the first set luminance value and the average luminance value of the disparity image.

When the average luminance value of the disparity image is equal to or less than the first set luminance value, there may be a problem with the brightness of the parallax barrier 3D image rather than the crosstalk of the parallax barrier 3D image. Therefore, the processor 270 may increase the luminance of the parallax barrier 3D image by increasing the open slit ratio.

For example, when the first set luminance value is 50% and the average luminance value of the disparity image is 40%, the processor 270 may increase the open slit ratio. Thus, the luminance of the parallax barrier 3D image may be increased.

When the average luminance value of the disparity image is equal to or larger than the second set luminance value, the processor 270 may reduce the crosstalk value of the parallax barrier 3D image by reducing the open slit ratio, based on a difference between the second set luminance value and the average luminance value of the disparity image, The second set luminance value may correspond to the crosstalk value of the maximum parallax barrier 3D image that the user can tolerate. The second set luminance value may be a value determined by an experiment. The processor 270 may adjust the second set luminance value in response to the user input. The processor 270 may store the adjusted second set luminance value in the memory 220. The second set luminance value may be equal to or larger than the first set luminance value.

When the average luminance value of the disparity image is equal to or less than the second set luminance value, the user can feel that the noise of the parallax barrier 3D image is severe. Therefore, the processor 270 may reduce the open slit ratio based on a difference between the second set luminance value and the average luminance value of the disparity image.

When the average luminance value of the disparity image is equal to or larger than the second set luminance value, there may be a problem with the crosstalk of the parallax barrier 3D image rather than the brightness of the parallax barrier 3D image. Therefore, the processor 270 may decrease the crosstalk of the parallax barrier 3D image by reducing the open slit ratio.

For example, when the second set luminance value is 60% and the average luminance value of the disparity image is 70%, the processor 270 may reduce the open slit ratio. Thus, the crosstalk value of the parallax barrier 3D image may be reduced.

When the open slit ratio is adjusted, the processor 270 may adjust the disparity image so that the disparity image and the parallax barrier may correspond to each other.

When the disparity image corresponds to a parallax barrier, if the open slit ratio is adjusted, the form of the parallax barrier may be changed, so that the disparity image may not correspond to the parallax barrier. In this case, the three-dimensional effect of the parallax barrier 3D image may be deteriorated.

When the open slit ratio is adjusted, the processor 270 may adjust the disparity image so that the disparity image and the parallax barrier may correspond to each other. Thus, the three-dimensional effect of the parallax barrier 3D image may not be deteriorated.

When the open slit ratio is adjusted, the processor 270 may adjust the backside distance which is a gap between the barrier unit 231 and the image output unit 232, based on the adjusted open slit ratio.

When the open slit ratio is adjusted, the portion of the disparity image seen by both eyes of user is changed, and the state in which the left eye of the user can see only the L image and the right eye can see only the R image cannot be maintained. Accordingly, the three-dimensional effect of the parallax barrier 3D image may be deteriorated.

When the open slit ratio is adjusted, the width of the block section or the slit section is adjusted. Thus, the processor 270 may adjust the backside distance so that the state in which the left eye of the user can see only the L image and the right eye can see only the R image can be maintained. In this case, the three-dimensional effect of the parallax barrier 3D image may not be deteriorated.

For example, when the open slit ratio is increased, the slit section of the barrier unit 231 is enlarged. Thus, the portion of the disparity image seen by the eye of the user may be enlarged. When the backside distance is reduced, the barrier unit 231 and the image output unit 232 approach to each other, so that the portion of the disparity image seen by the eye of the user may be reduced. Accordingly, when the open slit ratio is increased, the processor 270 may reduce the backside distance, thereby preventing the three-dimensional effect of the parallax barrier 3D image from deteriorating.

The display apparatus 200 for vehicle may include a motor (not shown) capable of adjusting the backside distance between the barrier unit 231 and the image output unit 232. The motor may be electrically connected to the processor 270. The processor 270 may control the motor to adjust the backside distance.

The processor 270 may adjust the backside distance so that the open slit ratio is inversely proportional to the back side distance.

For example, when the open slit ratio decreases, the slit section of the barrier unit 231 is reduced, so that the portion of the disparity image seen by both eyes of the user may be reduced. In this case, when the backside distance increases, the barrier unit 231 and the image output unit 232 are distant from each other, so that the portion of the disparity image seen by both eyes of the user may be enlarged. Accordingly, when the open slit ratio is reduced, the processor 270 may increase the backside distance so that the three-dimensional effect of the parallax barrier 3D image may not be deteriorated.

The processor 270 may increase the backside distance when the open slit ratio decreases, and reduce the backside distance when the open slit ratio increases.

The barrier unit 231 may include a plurality of barrier areas. The plurality of barrier areas may individually implement a parallax barrier. The open slit ratios of the parallax barrier implemented in the plurality of barrier areas may be different from each other.

The processor 270 may control the plurality of barrier areas individually. Accordingly, the processor 270 may implement a plurality of parallax barriers in the barrier unit 231.

For example, the barrier unit 231 may include a first barrier area, a second barrier area, and a third barrier area. The processor 270 may implement a first parallax barrier in the first barrier area, a second parallax barrier in the second barrier area, and a third parallax barrier in the third barrier area. In this case, the first parallax barrier, the second parallax barrier, and the third parallax barrier may be implemented in the barrier unit 231. The open slit ratios of the first parallax barrier, the second parallax barrier, and the third parallax barrier may be different from each other.

The processor 270 may individually adjust the open slit ratios of the plurality of barrier areas, based on the average luminance value of each portion of the disparity image corresponding to each of the plurality of barrier areas.

For example, when the average luminance value of a portion of the disparity image corresponding to the first barrier area is 60%, the average luminance value of a portion of the disparity image corresponding to the second barrier area is 50%, and the average luminance value of a portion of the disparity image corresponding to the third barrier area is 40%, the processor 270 may adjust the open slit ratio of the first barrier area to 41%, adjust the open slit ratio of the second barrier area to 50%, and adjust the open slit ratio of the third barrier area to 58%.

The image output unit 232 may include a plurality of image areas for outputting a plurality of images corresponding to the plurality of barrier areas, respectively.

For example, when the barrier unit 231 includes the first barrier area, the second barrier area, and the third barrier area, the image output unit 232 may include a first image area corresponding to the first barrier area, a second image area corresponding to the second barrier area, and a third image area corresponding to the third barrier area.

The processor 270 may individually adjust the open slit ratios of the plurality of barrier areas, based on the average luminance value of each of the plurality of image areas.

For example, when the average luminance value of the first image area is 60%, the average luminance value of the second image area is 50%, and the average luminance value of the third image area is 40%, the processor 270 may adjust the open slit ratio of the first barrier area to 41%, adjust the open slit ratio of the second barrier area to 50%, and adjust the open slit ratio of the third barrier area to 58%.

The processor 270 may adjust the open slit ratio of the barrier area corresponding to the image area, among the plurality of image areas, from which a 2D image is outputted to 100%. When the 2D image is outputted to the image output unit 231, even if a parallax barrier is implemented in the barrier unit 231, a three-dimensional effect is not generated in the image displayed on the display unit 230. Therefore, the parallax barrier need not be implemented in the barrier unit 231. In the case where the parallax barrier is not implemented in the barrier unit 231, since the entire barrier unit 231 is transparent, the open slit ratio of the barrier unit 231 is 100%.

The processor 270 may adjust the open slit ratio of the barrier area corresponding to the image area, among the plurality of image areas, from which the disparity image is outputted, based on the average luminance value of the outputted disparity image.

For example, a disparity image having an average luminance value of 60% is outputted from the first image area, a 2D image is outputted from the second image area, and a disparity image having an average luminance value of 40% is outputted from the third image area, the processor 270 may adjust the open slit ratio of the first barrier area to 41%, adjust the open slit ratio of the second barrier area to 100%, and adjust the open slit ratio of the third barrier area to 58%.

The processor 270 may output the image selected based on the user input to the image area selected based on the input of the user among the plurality of image areas.

The input unit 210 may receive a user input for selecting one of a plurality of image areas. In addition, the input unit 210 may receive a user input for selecting an image to be outputted to the image area. The processor 270 may output an image selected in response to a user input for selecting an image to an image area selected in response to a user input for selecting one of the plurality of image areas. Accordingly, the user may output a desired image to a desired image area.

For example, the processor 270 may output a speedometer image to the first image area, a rear camera image to the second image area, and an engine RPM image to the third image area, based on the user input. When the average luminance value of the speedometer image is 25%, the rear camera image is the 2D image and the average luminance value of the engine RPM image is 25%, the processor 270 may adjust the open slit ratio of the first barrier area to 60%, adjust the open slit ratio of the second barrier area to 100%, and adjust the open slit ratio of the third barrier area to 60%.

The open slit ratio of the barrier unit 231 may be a preset value corresponding to the average luminance value of the disparity image. For example, the preset open slit ratio corresponding to the average luminance value 25% of the disparity image may be 58%. The processor 270 may adjust the open slit ratio based on the preset open slit ratio corresponding to the average luminance value of the disparity image.

The processor 270 may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for performing other functions.

FIG. 5A to FIG. 5E are flowcharts for explaining a method of controlling a display apparatus for vehicle according to an embodiment of the present invention.

Figure 5A:
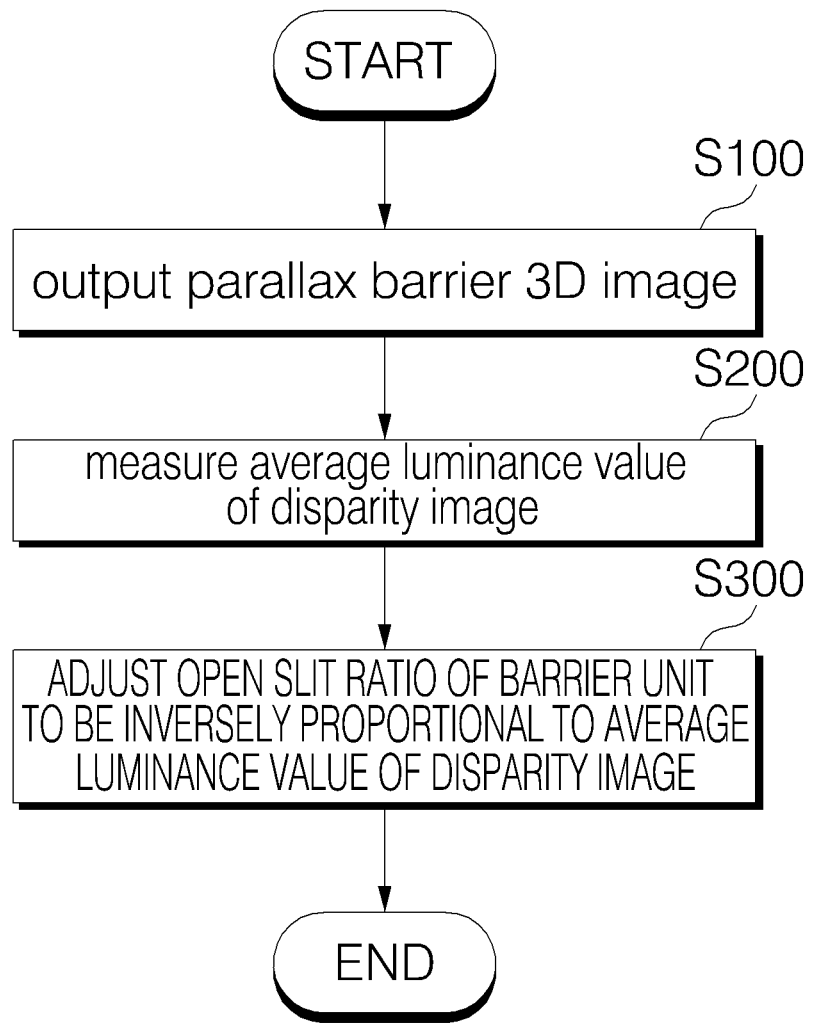
FIG. 5A to FIG. 5E are flowcharts for explaining a method of controlling a display apparatus for vehicle according to an embodiment of the present invention.

Referring to FIG. 5A, the method of controlling a display apparatus 200 for vehicle includes adjusting the open slit ratio of the barrier unit 231, based on the average luminance value of the disparity image outputted to the image output unit 232.

The processor 270 may output a parallax barrier 3D image, by outputting a disparity image to the image output unit 231 and implementing a parallax barrier in the barrier unit (S100).

The parallax barrier 3D image is a 3D image that can be viewed without separate equipment such as glasses.

The disparity image is a combination of the L image and the R image. The parallax barrier formed of an opaque block section and a transparent slit section may allow the left eye of the user to view only the L image and allow the right eye of the user to view only the R image. In this case, the user may feel a three-dimensional effect by viewing the image displayed on the display unit 230. The 3D image providing such a three-dimensional effect may be called the parallax barrier 3D image.

The processor 270 may measure the average luminance value of the disparity image (S200). The average luminance value of the disparity image may be an average value of the luminance of the plurality of pixels included in the image output unit 232, when the disparity image is outputted.

The processor 270 may adjust the open slit ratio of the barrier unit 231, based on the average luminance value of the disparity image (S300).

The processor 270 may adjust the open slit ratio to be in inverse proportion to the average luminance value of the disparity image to increase the luminance of the parallax barrier 3D image or reduce the crosstalk value of the parallax barrier 3D image.

The open slit ratio of the barrier unit 231 may be a preset value which is in inverse proportion to the average luminance value of the disparity image. For example, the preset open slit ratio corresponding to the average luminance value 25% of the disparity image may be 58%, and the preset open slit ratio corresponding to the average luminance value 75% of the disparity image may be 40%. The processor 270 may adjust the open slit ratio, based on the preset open slit ratio which is in inverse proportion to the average luminance value of the disparity image.

The preset open slit ratio corresponding to the average luminance value of the disparity image may be a value determined by an experiment. The preset open slit ratio corresponding to the average luminance value of the disparity image may be a data table stored in the memory 220. The processor 270 may adjust the open slit ratio, based on a preset open slit ratio corresponding to the average luminance value of the disparity image stored in the memory 220.

Figure 5B:
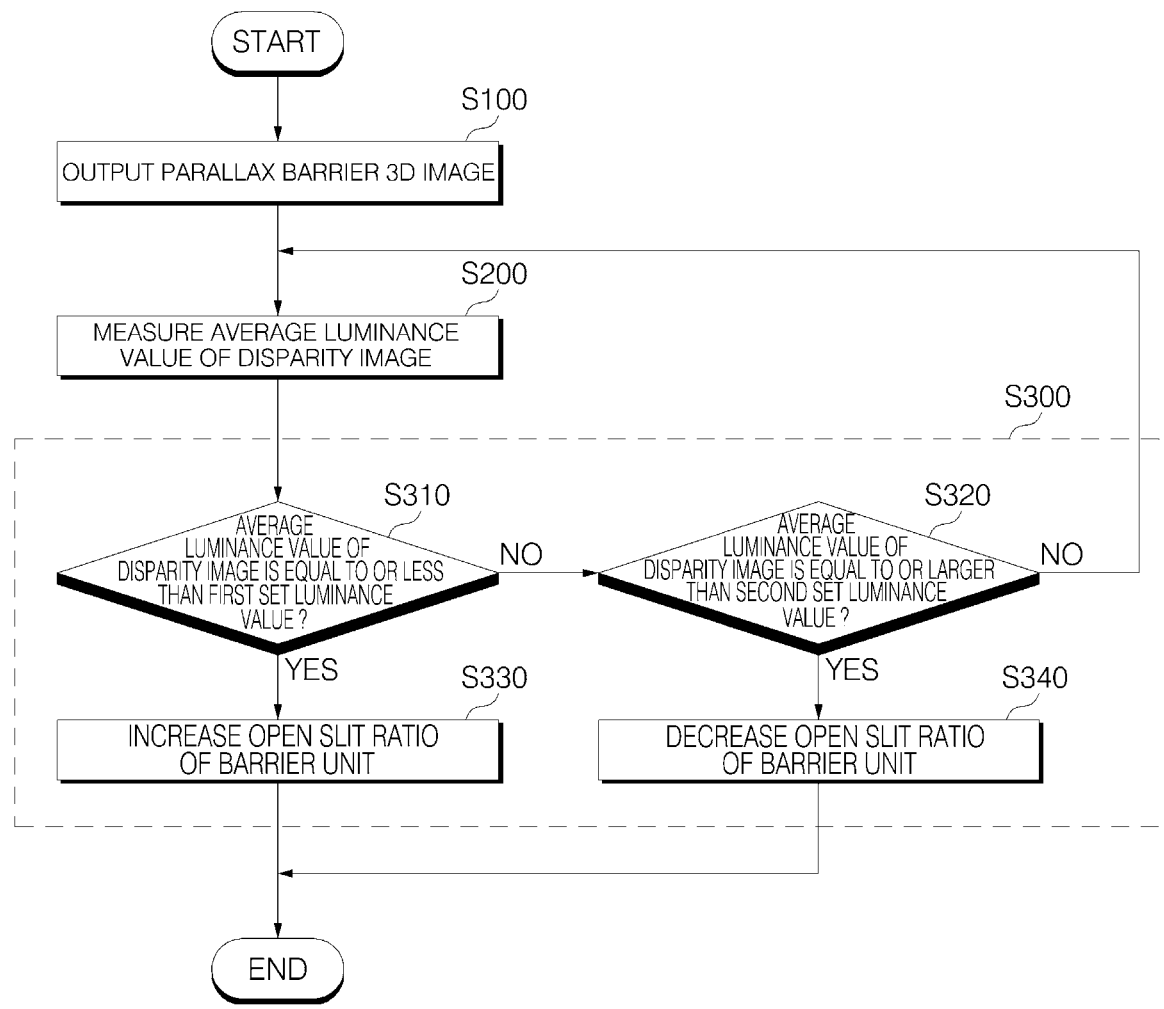

Referring to FIG. 5B, the method of controlling a display apparatus 200 for vehicle may adjust the open slit ratio of the barrier unit 231, based on the first set luminance value or the second set luminance value.

The processor 270 may output a parallax barrier 3D image, by outputting a disparity image to the image output unit 231 and implementing a parallax barrier in the barrier unit (S100).

The processor 270 may measure the average luminance value of the disparity image (S200).

The processor 270 may determine whether the average luminance value of the disparity image is equal to or less than the first set luminance value (S310).

When it is determined that the average luminance value of the disparity image is equal to or less than the first set luminance value, the processor 270 may increase the open slit ratio, based on a difference between the first set luminance value and the average luminance value of the disparity image (S330).

When the open slit ratio of the barrier unit 231 is increased, the luminance of the parallax barrier 3D image may be increased. The processor 270 may increase the luminance of the parallax barrier 3D image by increasing the open slit ratio.

The first set luminance value may correspond to a minimum brightness required for the user to view the parallax barrier 3D image. The first set luminance value may be a value determined by an experiment. The processor 270 may adjust the first set luminance value in response to the user input. The processor 270 may store the first set luminance value in the memory 220.

When the average luminance value of the disparity image is equal to or less than the first set luminance value, there may be a problem with the brightness of the parallax barrier 3D image rather than the crosstalk of the parallax barrier 3D image. Therefore, the processor 270 may increase the luminance of the parallax barrier 3D image by increasing the open slit ratio.

For example, when the first set luminance value is 50% and the average luminance value of the disparity image is 30%, the processor 270 may increase the open slit ratio. Thus, the luminance of the parallax barrier 3D image may be increased.

When it is determined that the average luminance value of the disparity image is larger than the first set luminance value, the processor 270 may determine whether the average luminance value of the disparity image is equal to or larger than the second set luminance value (S320). The second set luminance value may be equal to or larger than the first set luminance value.

When it is determined that the average luminance value of the disparity image is equal to or larger than the second set luminance value, the processor 270 may reduce the open slit ratio, based on a difference between the second set luminance value and the average luminance value of the disparity image (S340).

When the open slit ratio of the barrier unit 231 is reduced, the crosstalk value of the parallax barrier 3D image may increase. The processor 270 may increase the crosstalk value of the parallax barrier 3D image by reducing the open slit ratio.

The second set luminance value may correspond to the maximum crosstalk value of the parallax barrier 3D image that the user can tolerate. The second set luminance value may be a value determined by an experiment. The processor 270 may adjust the second set luminance value in response to the user input. The processor 270 may store the adjusted second set luminance value in the memory 220.

When the average luminance value of the disparity image is equal to or larger than the second set luminance value, there may be a problem with the crosstalk of the parallax barrier 3D image rather than the brightness of the parallax barrier 3D image. Thus, the processor 270 may reduce the crosstalk value of the parallax barrier 3D image by reducing the open slit ratio.

For example, when the second set luminance value is 60% and the average luminance value of the disparity image is 70%, the processor 270 may reduce the open slit ratio. Thus, the crosstalk value of the parallax barrier 3D image may be reduced.

Figure 5C:
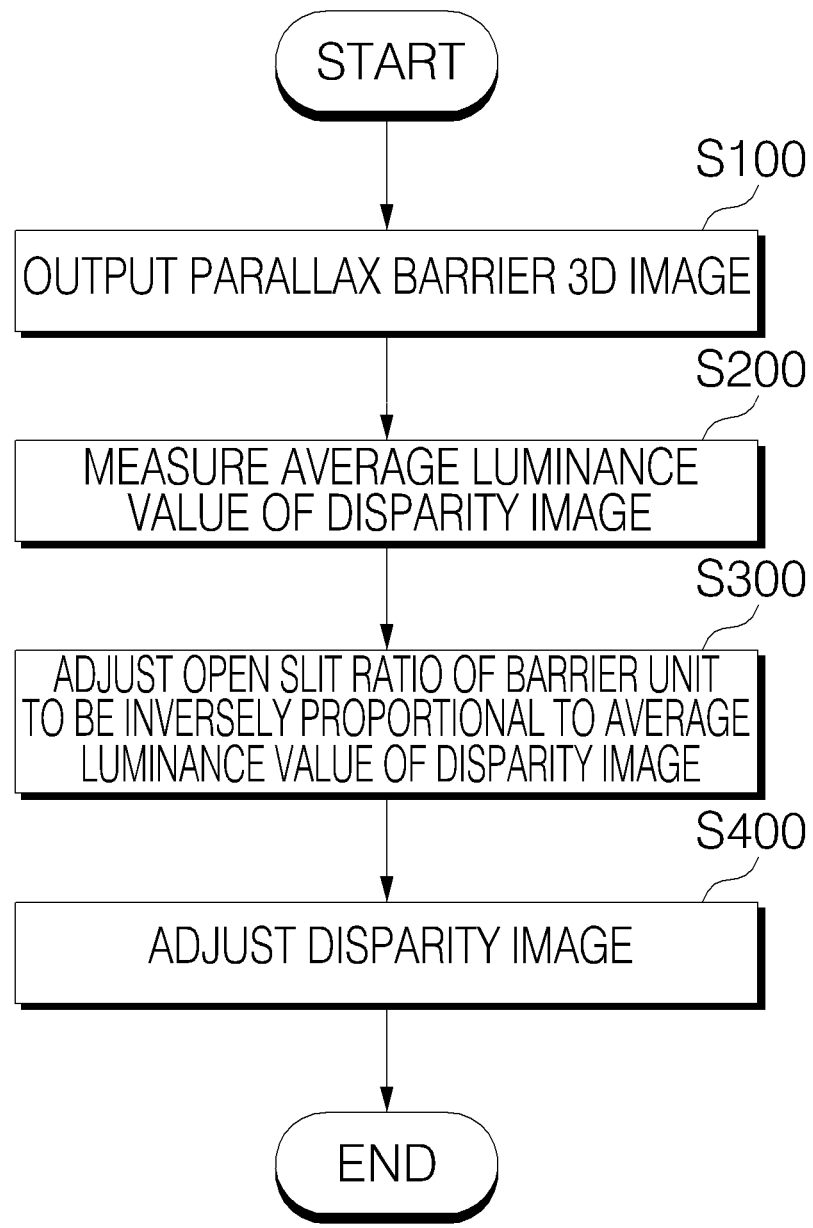

Referring to FIG. 5C, the method of controlling the display apparatus 200 for vehicle may adjust the disparity image so that the disparity image and the parallax barrier may correspond to each other when the open slit ratio is adjusted.

The processor 270 may output a parallax barrier 3D image, by outputting a disparity image to the image output unit 231 and implementing a parallax barrier in the barrier unit (S100).

The processor 270 may measure the average luminance value of the disparity image (S200).

The processor 270 may adjust the open slit ratio of the barrier unit 231 to be inversely proportional to the average luminance value of the disparity image, based on the average luminance value of the disparity image (S300).

The processor 270 may adjust the disparity image so that the disparity image and the parallax barrier may correspond to each other, when the open slit ratio is adjusted (S400).

In the case where the disparity image corresponds to the parallax barrier, when the open slit ratio is adjusted, the form of the parallax barrier may be changed. Thus, the disparity image may not correspond to the parallax barrier. In this case, the three-dimensional effect of the parallax barrier 3D image may be deteriorated.

When the open slit ratio is adjusted, the processor 270 may adjust the disparity image so that the disparity image and the parallax barrier correspond to each other. Thus, the three-dimensional effect of the parallax barrier 3D image may not be deteriorated.

Figure 5D:
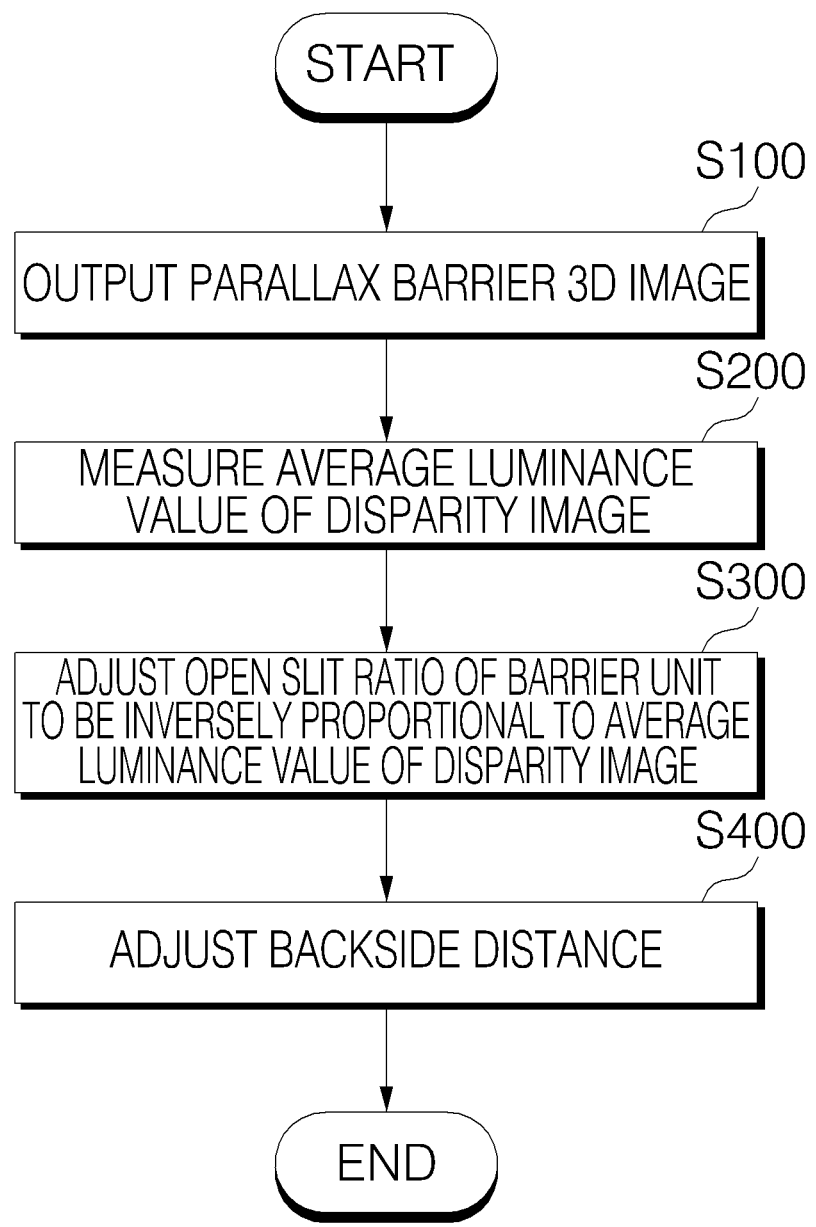

Referring to FIG. 5D, when the open slit ratio is adjusted, the method of controlling the display apparatus 200 for vehicle may adjust the backside distance so that the disparity image and the parallax barrier correspond to each other.

The processor 270 may output a parallax barrier 3D image, by outputting a disparity image to the image output unit 231 and implementing a parallax barrier in the barrier unit (S100).

The processor 270 may measure the average luminance value of the disparity image (S200).

The processor 270 may adjust the open slit ratio of the barrier unit 231 to be inversely proportional to the average luminance value of the disparity image, based on the average luminance value of the disparity image (S300).

When the open slit ratio is adjusted, the processor 270 may adjust the backside distance which is a gap between the barrier unit 231 and the image output unit 232, based on the adjusted open slit ratio (S400).

When the open slit ratio is adjusted, the portion of the disparity image seen by both eyes of user is changed, and the state in which the left eye of the user can see only the L image and the right eye can see only the R image cannot be maintained. Accordingly, the three-dimensional effect of the parallax barrier 3D image may be deteriorated.

When the open slit ratio is adjusted, the width of the block section or the slit section is adjusted. Thus, the processor 270 may adjust the backside distance so that the state in which the left eye of the user can see only the L image and the right eye can see only the R image can be maintained. In this case, the three-dimensional effect of the parallax barrier 3D image may not be deteriorated.

The processor 270 may adjust the backside distance so that the open slit ratio is inversely proportional to the back side distance. The processor 270 may increase the back distance if the open slit ratio decreases, and reduce the back distance if the open slit ratio increases.

For example, when the open slit ratio is increased, the slit section of the barrier unit 231 is enlarged. Thus, the portion of the disparity image seen by the eye of the user may be enlarged. When the backside distance is reduced, the barrier unit 231 and the image output unit 232 approach to each other, so that the portion of the disparity image seen by the eye of the user may be reduced. Accordingly, when the open slit ratio is increased, the processor 270 may reduce the backside distance, thereby preventing the three-dimensional effect of the parallax barrier 3D image from deteriorating.

For example, when the open slit ratio decreases, the slit section of the barrier unit 231 is reduced, so that the portion of the disparity image seen by the user's eye may be reduced. In this case, when the backside distance increases, the barrier unit 231 and the image output unit 232 are distant from each other, so that the portion of the disparity image seen by both eyes of the user may be enlarged. Accordingly, when the open slit ratio is reduced, the processor 270 may increase the backside distance so that the three-dimensional effect of the parallax barrier 3D image may not be deteriorated.

The display apparatus 200 for vehicle may include a motor (not shown) capable of adjusting the backside distance between the barrier unit 231 and the image output unit 232. The motor may be electrically connected to the processor 270. The processor 270 may control the motor to adjust the backside distance.

Figure 5E:
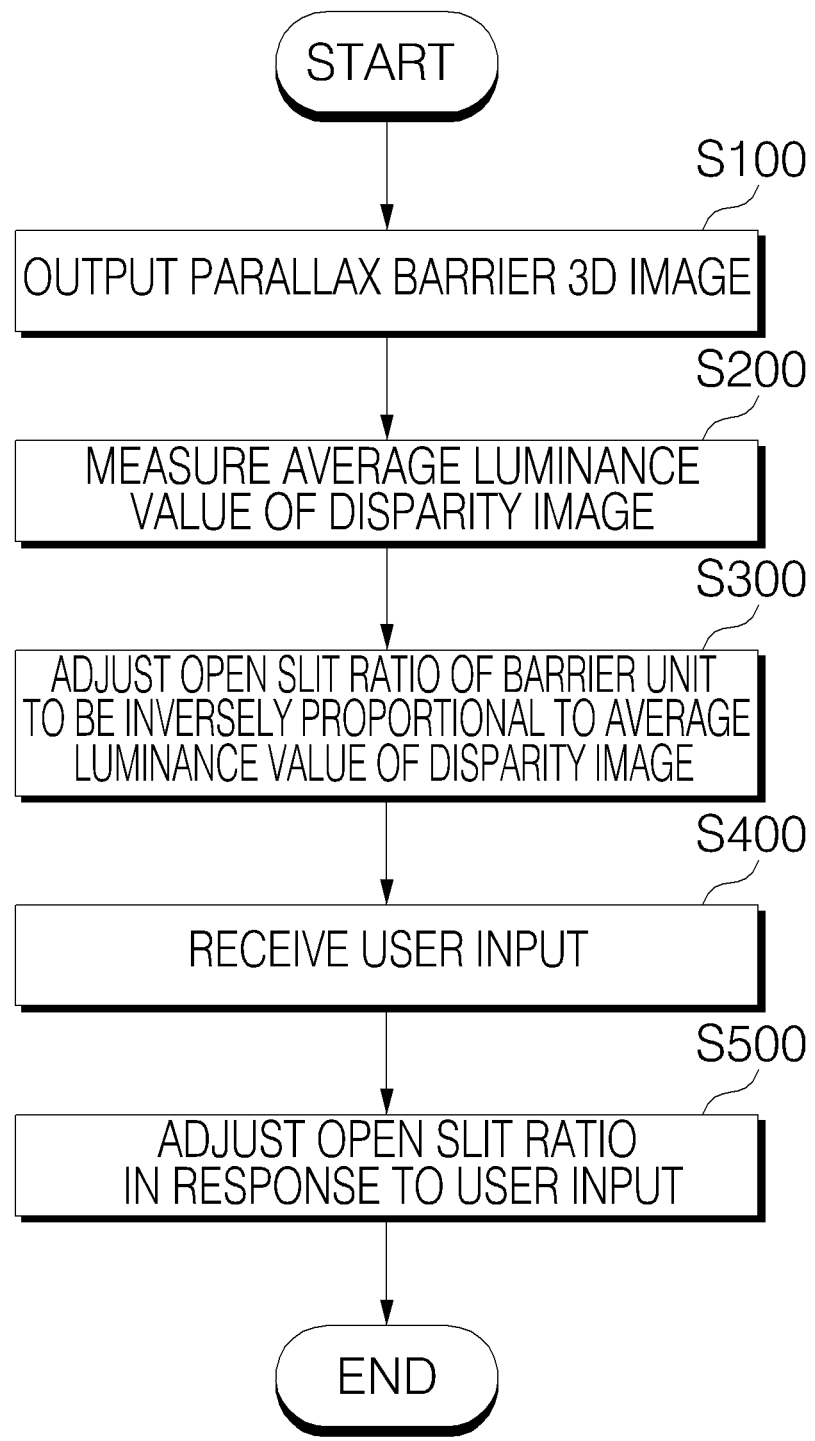

Referring to FIG. 5E, the method of controlling the display apparatus 200 for vehicle may adjust the open slit ratio in response to a user input.

The processor 270 may output a parallax barrier 3D image, by outputting a disparity image to the image output unit 231 and implementing a parallax barrier in the barrier unit (S100).

The processor 270 may measure the average luminance value of the disparity image (S200).

The processor 270 may adjust the open slit ratio of the barrier unit 231 to be inversely proportional to the average luminance value of the disparity image, based on the average luminance value of the disparity image (S300).

The processor 270 may receive the user input for the luminance of the parallax barrier 3D image or the crosstalk value of the parallax barrier 3D image through the input unit 210 (S400).

The luminance of the parallax barrier 3D image or tolerable crosstalk value of the parallax barrier 3D image required for each user may be different. For example, a first user may prefer a bright parallax barrier 3D image even if the crosstalk value is large. A second user may prefer a parallax barrier 3D image having a relatively small crosstalk value even though it is relatively dark.

The processor 270 may adjust the open slit ratio of the barrier unit 231 so that the luminance of the parallax barrier 3D image or the crosstalk value of the parallax barrier 3D image is changed in correspondence with the received user input.

Figure 6:
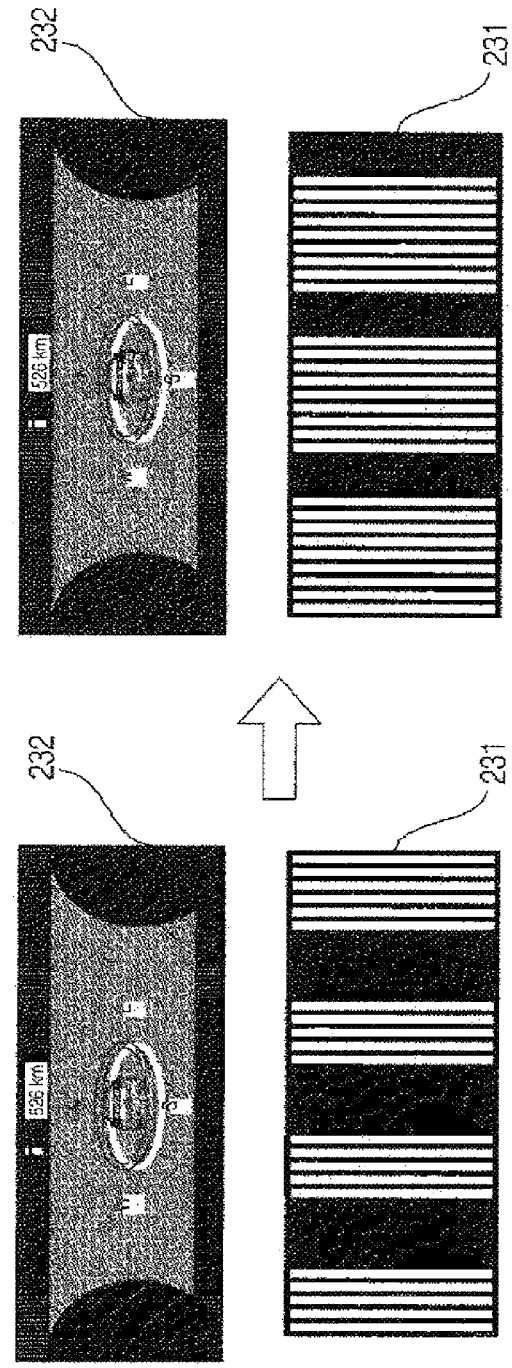
FIG. 6 is a diagram for explaining an increase in an open slit ratio, when a disparity image of a first set luminance value or less is outputted to an image output unit of the display apparatus for vehicle according to the present invention.

FIG. 6 is a diagram for explaining an increase of the open slit ratio, when a disparity image of a first set luminance value or less is outputted to the image output unit of the display apparatus for vehicle according to the present invention.

The processor 270 may output the parallax barrier 3D image to the display unit 230 by implementing the parallax barrier in the barrier unit 231 and outputting the disparity image to the image output unit 232.

For example, the processor 270 may implement a parallax barrier having an open slit ratio of 50% in the barrier unit 231 and output a disparity image having an average luminance value 25% to the image output unit 232.

The processor 270 may determine whether the average luminance value of the disparity image outputted to the image output unit 232 is equal to or less than the first set luminance value.

The average luminance value of the disparity image is an average value of the luminance of a plurality of pixels included in the image output unit 232 when a disparity image is outputted to the image output unit 232.

The first set luminance value may correspond to the minimum brightness of the parallax barrier 3D image required for the user to view the parallax barrier 3D image. The first set luminance value may be a value determined by an experiment. For example, the first set luminance value may be 50%. The processor 270 may adjust the first set luminance in correspondence with the user input. The processor 270 may store the first set luminance value in the memory 220.

When it is determined that the average luminance value of the disparity image is equal to or less than the first set luminance value, the processor 270 may increase the open slit ratio of the barrier unit 231, based on the difference between the first set luminance value and the average luminance value of the disparity image.

When the average luminance value of the disparity image is equal to or less than the first set luminance value, there may be a problem with the brightness of the parallax barrier 3D image rather than the crosstalk of the parallax barrier 3D image. In this case, the processor 270 may increase the luminance of the parallax barrier 3D image by increasing the open slit ratio.

When the open slit ratio of the barrier unit 231 is increased, the slit section of the barrier unit 231 is increased and the block section is decreased, so that the luminance of the parallax barrier 3D image may be increased. The processor 270 may increase the luminance of the parallax barrier 3D image by increasing the open slit ratio.

For example, when the average luminance value of the disparity image is 25% and the first set luminance value is 50%, the average luminance value of the disparity image is equal to or less than the first set luminance value. Thus, the processor 270 may increase the open slit ratio. When the open slit ratio is 50%, the open slit ratio may be adjusted to 60%. In this case, the luminance of the parallax barrier 3D image displayed on the display unit 230 may increase.

Figure 7:
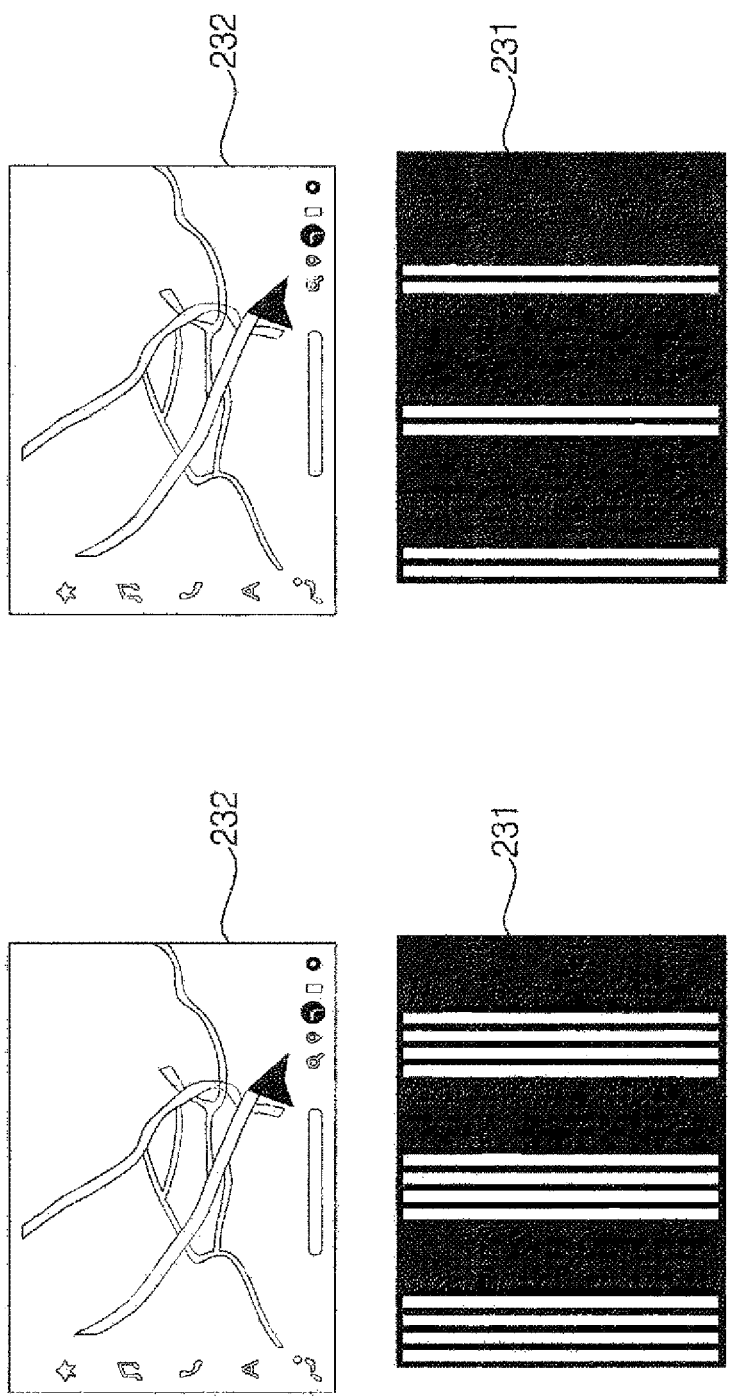
FIG. 7 is a diagram for explaining a decrease in an open slit ratio, when a disparity image of a second set luminance value or more is outputted to an image output unit of the display apparatus for vehicle according to the present invention.

FIG. 7 is a diagram for explaining a decrease in an open slit ratio, when a disparity image of a second set luminance value or more is outputted to an image output unit of the display apparatus for vehicle according to the present invention.

The processor 270 may output the parallax barrier 3D image to the display unit 230 by implementing the parallax barrier in the barrier unit 231 and outputting the disparity image to the image output unit 232.

For example, the processor 270 may implement a parallax barrier having an open slit ratio 50% in the barrier unit 231 and output a disparity image having an average luminance value 75% to the image output unit 232.

The processor 270 may determine whether the average luminance value of the disparity image outputted to the image output unit 232 is equal to or less than the second set luminance value. The second set luminance value may be equal to or larger than the first set luminance value.

The second set luminance value may correspond to the maximum crosstalk value of the parallax barrier 3D image that the user can tolerate. The second set luminance value may be a value determined by an experiment. For example, the second setting luminance may be 55%. The processor 270 may adjust the second set luminance value in response to the user input. The processor 270 may store the adjusted second set luminance value in the memory 220.

When the average luminance value of the disparity image is equal to or larger than the second set luminance value, there may be a problem with the crosstalk of the parallax barrier 3D image rather than the brightness of the parallax barrier 3D image. Thus, the processor 270 may reduce the crosstalk value of the parallax barrier 3D image by reducing the open slit ratio.

When it is determined that the average luminance value of the disparity image is equal to or larger than the second set luminance value, the processor 270 may reduce the open slit ratio, based on the difference between the second set luminance value and the average luminance value of the disparity image (S340).

When the open slit ratio of the barrier unit 231 is decreased, the crosstalk value of the parallax barrier 3D image may be increased. The processor 270 may increase the crosstalk value of the parallax barrier 3D image by reducing the open slit rate.

For example, when the second set luminance value is 55% and the average luminance value of the disparity image is 75%, the processor 270 may reduce the open slit ratio. When the open slit ratio is 50%, the open slit ratio may be adjusted to 42%. In this case, the crosstalk value of the parallax barrier 3D image displayed on the display unit 230 may be decreased.

Figure 8:
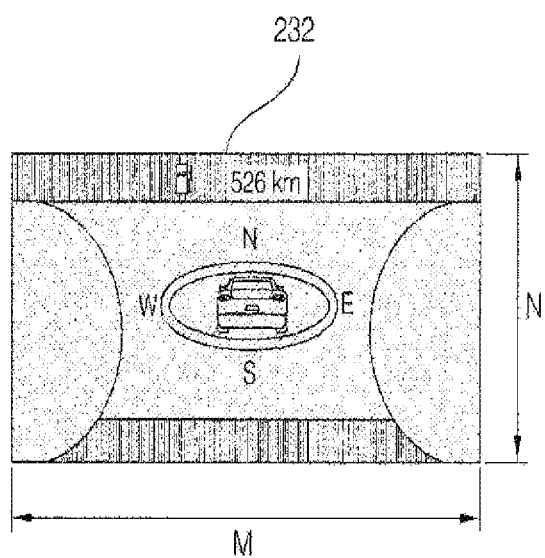
FIG. 8 is a diagram for explaining an average luminance value of a disparity image outputted to an image output unit of a display apparatus for vehicle according to the present invention.

FIG. 8 is a diagram for explaining an average luminance value of a disparity image outputted to an image output unit of a display apparatus for vehicle according to the present invention.

When a disparity image is outputted, the average luminance value of the disparity image is an average value of the luminance of a plurality of pixels included in the image output unit 232.

The image output unit 232 may include a plurality of pixels.

When a specific disparity image is outputted to the image output unit 232, the plurality of pixels have their own luminance respectively.

For example, the image output unit 232 may include M*N pixels. (Y)i may be the luminance of the i-th pixel. In this case, the average luminance value of the disparity image may be a value obtained by dividing the (Y)i value of M*N pixels by M*N.

The average luminance value of the disparity image may also be referred to as average brightness level (ABL).

Figure 9:
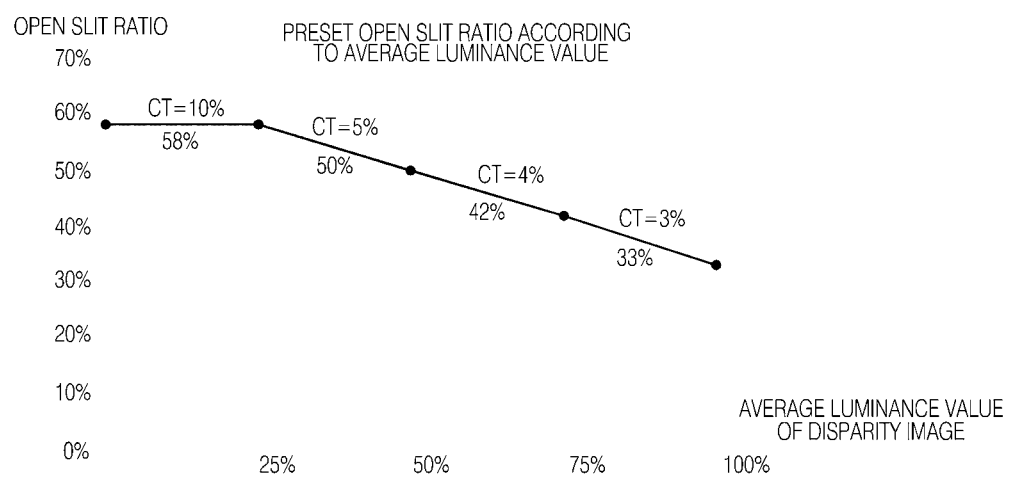
FIG. 9 is a graph for explaining the relationship between an average luminance value of disparity image and an open slit ratio.

FIG. 9 is a graph for explaining the relationship between an average luminance value of disparity image and an open slit ratio.

Referring to FIG. 9, the open slit ratio of the barrier unit 231 may be a preset value which is in inverse proportion to the average luminance value of the disparity image.

For example, when the average luminance value of the disparity image is 25% or less, the open slit ratio may be set to 58%. In this case, the processor 270 may adjust the open slit ratio to 58% when the average luminance value of the disparity image is 25% or less. Although the crosstalk value CT of the parallax barrier 3D image is 10% which is relatively high, there may be a problem with the low luminance of the parallax barriers 3D image. Thus, the processor 270 may increase the luminance of the parallax barrier 3D image by adjusting the open slit ratio to be relatively high.

For example, when the average luminance value of the disparity image is 25% or more, the open slit ratio may be set to be in inverse proportion to the average luminance value of the disparity image.

The processor 270 may adjust the open slit ratio to 50% when the average luminance value of the disparity image is 50%. In this case, the crosstalk value CT of the parallax barrier 3D image may be 5%.

The processor 270 may adjust the open slit ratio to 50% when the average luminance value of the disparity image is 50%. In this case, the crosstalk value CT of the parallax barrier 3D image may be 5%.

When the average luminance value of the disparity image is relatively high, there may be a problem with the crosstalk of the parallax barrier 3D image. In this case, the processor 270 may reduce the crosstalk value of the parallax barrier 3D image by adjusting the open slit ratio to 50% or less.

The processor 270 may adjust the open slit ratio to 42% when the average luminance value of the disparity image is 75%. In this case, the crosstalk value CT of the parallax barrier 3D image may be 4%.

The processor 270 may adjust the open slit ratio to 33% when the average luminance value of the disparity image is 90%. In this case, the crosstalk value CT of the parallax barrier 3D image may be 3%.

The preset open slit ratio corresponding to the average luminance value of the disparity image may be a value determined by an experiment. The preset open slit ratio corresponding to the average luminance value of the disparity image may be a data table stored in the memory 220. The processor 270 may adjust the open slit ratio, based on the data table for the open slit ratio corresponding to the average luminance value of the disparity image stored in the memory 220.

Figure 10:
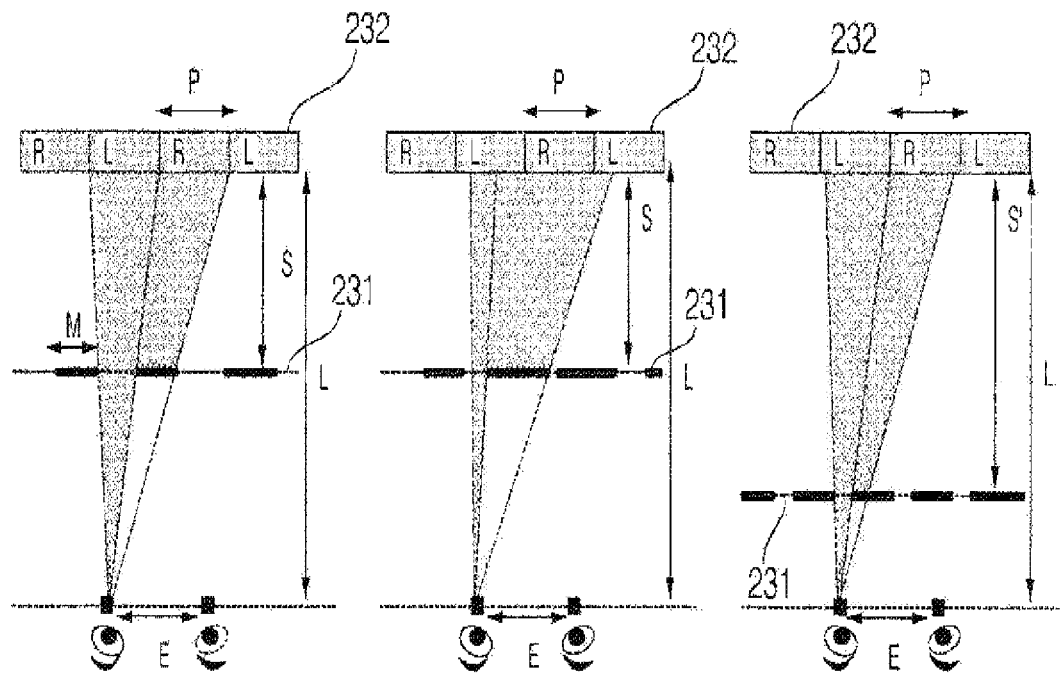
FIG. 10 is a diagram for explaining that a display apparatus 200 for vehicle according to the present invention adjusts a backside distance so that a disparity image and a parallax barrier may correspond to each other, when an open slit ratio is adjusted.

FIG. 10 is a diagram for explaining that a display apparatus 200 for vehicle according to the present invention adjusts a backside distance so that a disparity image and a parallax barrier may correspond to each other, when an open slit ratio is adjusted.

The processor 270 may output the parallax barrier 3D image to the display unit 230, by implementing the parallax barrier in the barrier unit 231 and outputting the disparity image to the image output unit 232.

The processor 270 may adjust the open slit ratio of the barrier unit 231, based on the average luminance value of the disparity image.

Before the open slit ratio is adjusted, since the left eye of the user can see only the L image and cannot see the R image, the user can see the 3D image of the parallax barrier having a three-dimensional effect.

When the open slit ratio is adjusted in correspondence with the average luminance value of the disparity image, the left eye of the user can see only a part of the L image and see a part of the R image, so that the three-dimensional effect of the parallax barrier 3D image may be deteriorated.

The processor 270 may adjust the backside distance which is a gap between the barrier unit 231 and the image output unit 232, based on the adjusted open slit ratio, when the open slit ratio is adjusted.

When the open slit ratio is adjusted, since the width of the block section or the slit section is adjusted, the state in which the left eye of the user can see only the L image and the right eye of the user can see only the R image cannot be maintained. Accordingly, the three-dimensional effect of the parallax barrier 3D image may be deteriorated.

The processor 270 may maintain the state in which the left eye of the user can see only the L image and the right eye of the user can see only the R image, by adjusting the backside distance. In this case, the three-dimensional effect of the parallax barrier 3D image may not be deteriorated.

The processor 270 may adjust the backside distance so that the open slit ratio is inversely proportional to the back side distance. The processor 270 may increase the backside distance if the open slit ratio is decreased, and reduce the backside distance if the open slit ratio is increased.

For example, when the open slit ratio is decreased, the slit section of the barrier unit 231 is reduced, so that the portion seen by the eye of the user in the disparity image may be reduced. In this case, when the backside distance increases, the barrier unit 231 and the image output part 232 are distant from each other, so that the portion seen by the eye of the user in the disparity image may be enlarged. Accordingly, when the open slit ratio is reduced, the processor 270 increases the backside distance so that the three-dimensional effect of the parallax barrier 3D image may not be deteriorated.

For example, when the open slit ratio is increased, since the slit section of the barrier unit 231 is widened, the portion seen by the eye of the user in the disparity image may be enlarged. When the backside distance is reduced, the barrier unit 231 and the image output unit 232 approach to each other, so that the portion of the disparity image seen by the eye of the user may be reduced. Accordingly, when the open slit ratio is increased, the processor 270 may reduce the backside distance, thereby preventing the three-dimensional effect of the parallax barrier 3D image from deteriorating.

When the backside distance is adjusted, the processor 270 may adjust the disparity image so that the parallax barrier and the disparity image may correspond to each other.

Figure 11:
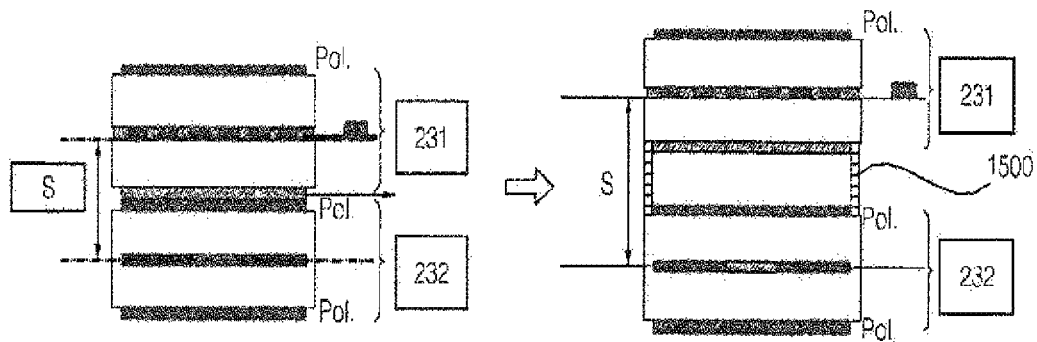
FIG. 11 is a diagram for explaining that a display apparatus 200 for vehicle according to the present invention adjusts a backside distance by using a motor.

FIG. 11 is a diagram for explaining that a display apparatus 200 for vehicle according to the present invention adjusts a backside distance by using a motor.

The display apparatus 200 for vehicle may include a motor 1500 capable of adjusting a backside distance between the barrier unit 231 and the image output unit 232. The motor 1500 may be electrically connected to the processor 270. The processor 270 may control the motor 1500 to adjust the backside distance.

The processor 270 may control the motor 1500 to increase the backside distance when the open slit ratio is decreased. The processor 270 may control the motor 1500 to decrease the backside distance when the open slit ratio is increased.

The motor 1500 may be disposed between the barrier unit 231 and the image output unit 232 or may be disposed from the barrier unit 231 and the image output unit 232 by a certain distance.

Figure 12:
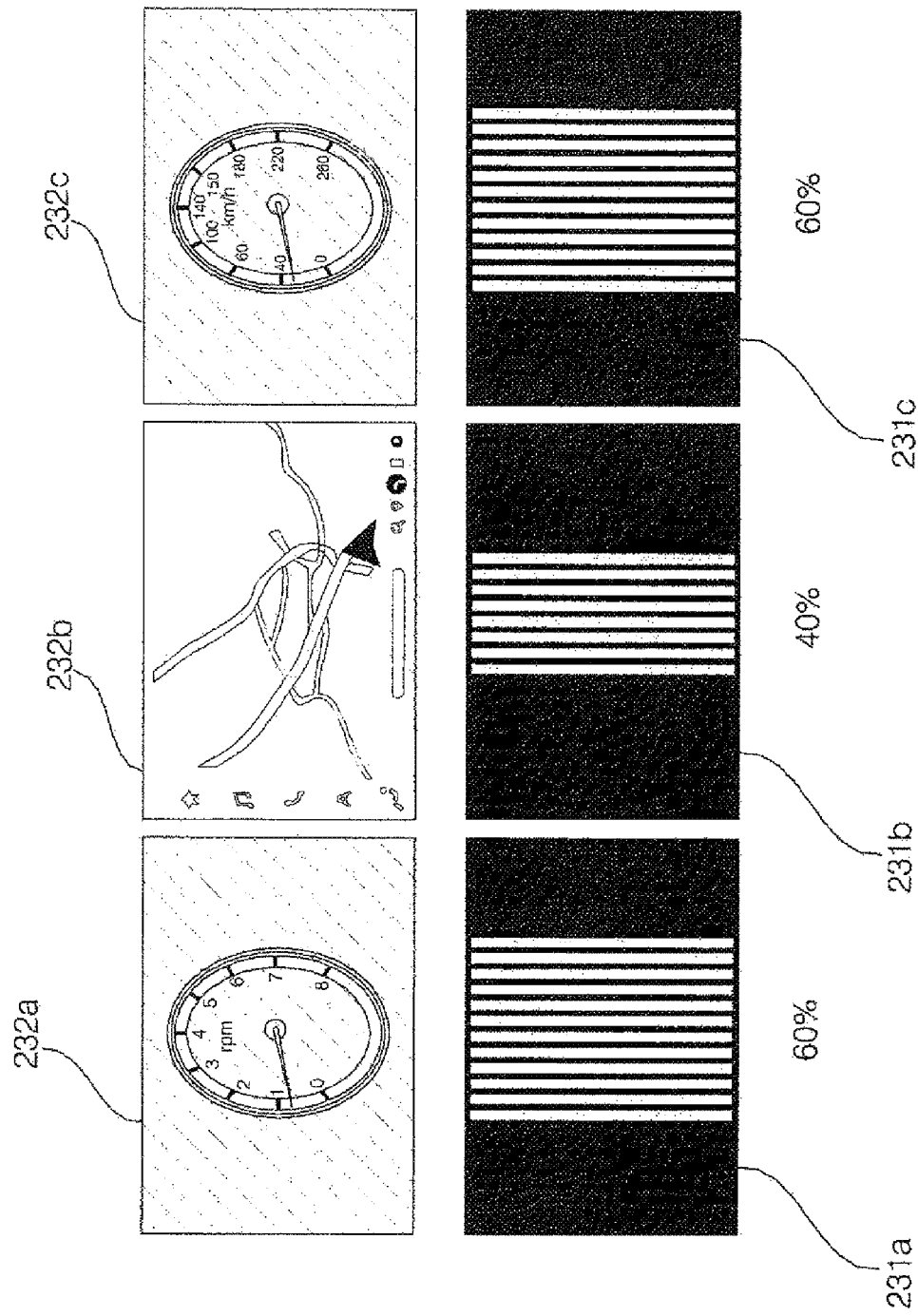
FIG. 12 is a diagram for explaining that a display apparatus 200 for vehicle according to the present invention adjusts an open slit ratio of a barrier area in correspondence with an average luminance value of each image area.

FIG. 12 is a diagram for explaining that a display apparatus 200 for vehicle according to the present invention adjusts an open slit ratio of a barrier area in correspondence with an average luminance value of each image area.

The barrier unit 231 may include a plurality of barrier areas 231*a*, 231*b*, and 231*c*. A parallax barrier may be individually implemented in the plurality of barrier areas 231*a*, 231*b*, and 231*c*. The open slit ratios of the parallax barrier implemented in the plurality of barrier areas 231*a*, 231*b*, and 231*c* may be different from each other.

The image output unit 232 may include a plurality of image areas 232*a*, 232*b*, and 232*c* that output a plurality of images corresponding to a plurality of barrier areas 231*a*, 231*b*, and 231*c*, respectively.

For example, when the barrier unit 231 includes a first barrier area 231*a*, a second barrier area 231*b*, and a third barrier area 231*c*, the image output unit 232 may include a first image area 232*a* corresponding to the first barrier area 231*a*, a second image area 232*b* corresponding to the second barrier area 231*b*, and a third image area 232*c* corresponding to the third barrier area 231*c*.

The processor 270 may output the image selected based on the user input, to the image area selected based on the input of the user among the plurality of image areas 232*a*, 232*b*, and 232*c*.

The input unit 210 may receive a user input for selecting one of a plurality of image areas. In addition, the input unit 210 may receive a user input for selecting an image to be outputted to the image area. The processor 270 may output an image selected in response to a user input for selecting an image, to an image area selected in response to a user input for selecting one of the plurality of image areas. Accordingly, the user may output a desired image to a desired image area.

For example, based on the user input, the processor 270 may output an engine RPM gauge image to the first image area 232*a*, a navigation image to the second image area 232*b*, and a speedometer image to the third image area 232*c*.

The processor 270 may individually adjust the open slit ratios of the plurality of barrier areas 231*a*, 231*b*, and 231*c*, based on the average luminance value of each of the plurality of image areas 232*a*, 232*b*, and 232*c*.

For example, when the average luminance value of the engine RPM gage image displayed in the first image area 232*a* is 10%, the processor 270 may adjust the open slit ratio of the first barrier area 231*a* to 60% based on the average luminance value of the first image area 232*a*.

For example, when the average luminance value of the navigation image displayed in the second image area 232*b* is 70%, the processor 270 may adjust the open slit ratio of the second barrier area 231*b* to 40% based on the average luminance value of the second image area 232*b*.

For example, when the average luminance value of the speedometer image displayed in the third image area 232*c* is 15%, the processor 270 may adjust the open slit ratio of the third barrier area 231*c* to 60% based on the average luminance value of the third image area 232*c*.

Figure 13:
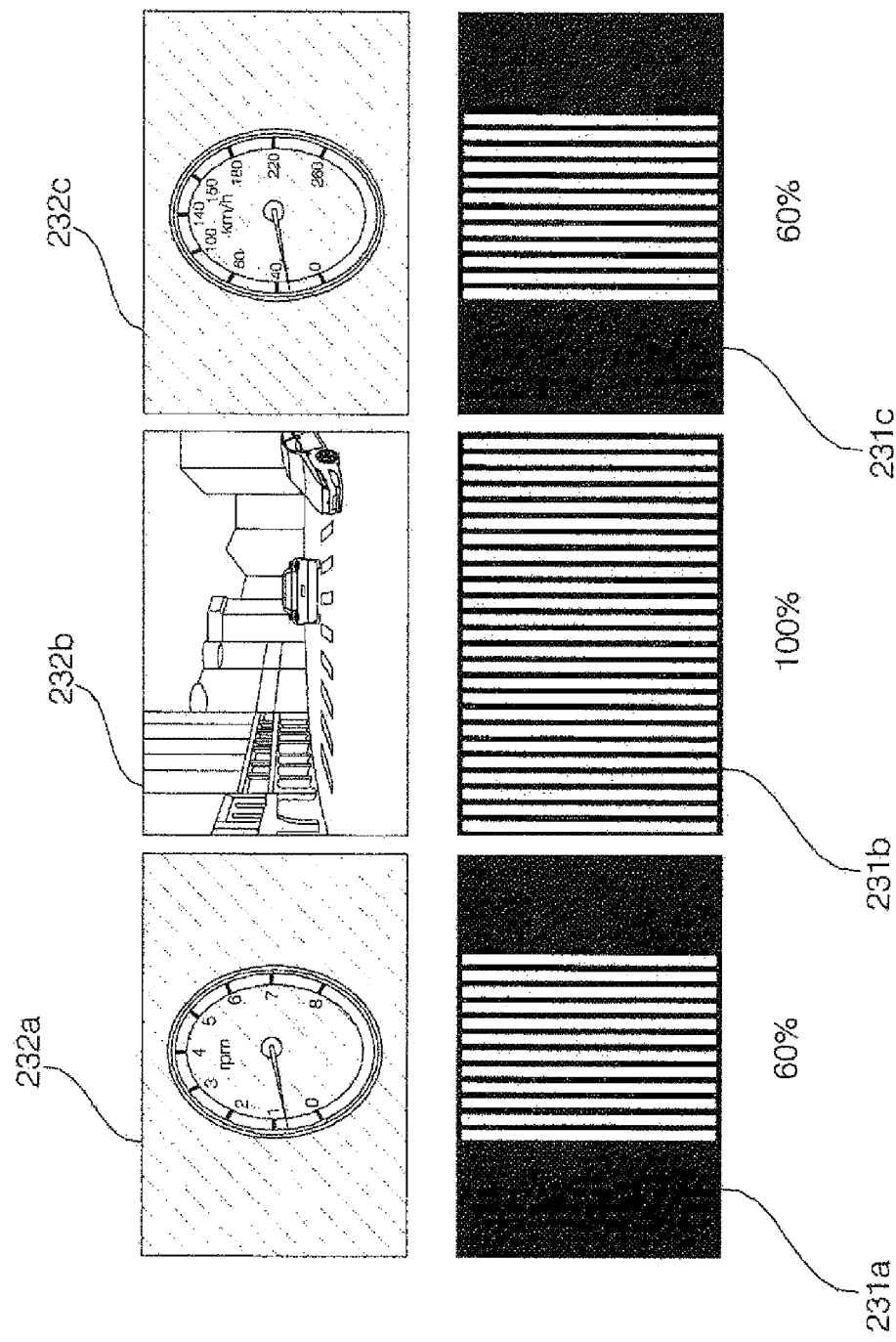
FIG. 13 is a diagram for explaining that a display apparatus 200 for vehicle according to the present invention adjusts an open slit ratio of a barrier area in correspondence with a 2D image or a 3D image.

FIG. 13 is a diagram for explaining that a display apparatus 200 for vehicle according to the present invention adjusts an open slit ratio of a barrier area in correspondence with a 2D image or a 3D image.

The processor 270 may output a 2D image or a parallax barrier 3D image to the display unit 230. When the 2D image is outputted to the display unit 230, the 2D image is outputted to the image output unit 232. When the parallax barrier 3D image is outputted to the display unit 230, a disparity image is outputted to the image output unit 232.

The processor 270 may output the 2D image or the disparity image selected based on the user input, to the image area selected based on the input of the user among the plurality of image areas 232*a*, 232*b* and 232*c*.

For example, based on the user input, the processor 270 may output an engine RPM gauge image, which is a disparity image, to the first image area 232*a*, a rear camera image, which is a 2D image, to the second image area 232*b*, and a speedometer image, which is a disparity image, to the third image area.

The processor 270 may adjust the open slit ratio of the barrier area, among the plurality of image areas, corresponding to the image area from which the 2D image is outputted to 100%. In the case where a 2D image is outputted to the image output unit 231, even if a parallax barrier is implemented in the barrier unit 231, a three-dimensional effect does not occur in the image displayed on the display unit 230. Thus, the parallax barrier does not need to be implemented in the barrier unit 231. In the case where the parallax barrier is not implemented in the barrier unit 231, the entire barrier unit 231 is transparent. Thus, the open slit ratio of the barrier unit 231 is 100%.

The processor 270 may adjust the open slit ratio of the barrier area, among the plurality of image areas, corresponding to the image area from which the disparity image is outputted, based on the average luminance value of the outputted disparity image.

For example, in the case where the engine RPM gauge image displayed in the first image area 232*a* is a disparity image having an average luminance value of 10%, the processor 270 may adjust the open slit ratio of the first barrier area 231*a* to 60% based on the average luminance value.

For example, when the rear camera image displayed in the second image area 232*b* is a 2D image, the processor 270 may adjust the open slit ratio of the second barrier area 231*b* to 100%.

For example, when the speedometer image displayed in the third image area 232*c* is a disparity image having an average luminance value of 15%, the processor 270 may adjust the open slit ratio of the third barrier area 231*c* to 60% based on the average luminance value.

Meanwhile, the present invention can be implemented as a computer-readable code on a medium on which a program is recorded. The computer-readable medium includes all kinds of recording apparatuses in which data that can be read by the processor is stored. Examples of the recording medium readable by the processor include a ROM, a RAM, a CD-ROM, a magnetic tape, a floppy disk, an optical data storage device, and the like, and may also be implemented in the form of a carrier wave such as transmission over the Internet. In addition, the computer may include the processor 270 or the controller 170. Accordingly, the above description should not be construed in a limiting sense in all respects and should be considered illustrative. The scope of the present invention should be determined by rational interpretation of the appended claims, and all changes within the scope of equivalents of the present invention are included in the scope of the present invention.

The invention claimed is:

1. A display apparatus for vehicle comprising:
a display unit configured to include a barrier unit and an image output unit; and
a processor configured to output a parallax barrier three-dimensional (3D) image to the display unit by implementing a parallax barrier in the barrier unit and outputting a disparity image to the image output unit, and to adjust an open slit ratio of the barrier unit based on an average luminance value of the disparity image,
wherein the processor is configured to:
increase a luminance of the parallax barrier 3D image or decrease a crosstalk value of the parallax barrier 3D image, by adjusting the open slit ratio to be in inverse proportion to the average luminance value of the disparity image, and
based on the average luminance value of the disparity image being equal to or less than a first set luminance value, increase the luminance of the parallax barrier 3D image by increasing the open slit ratio based on a difference between the first set luminance value and the average luminance value of the disparity image.

2. The display apparatus for vehicle of claim 1, wherein, when the average luminance value of the disparity image is equal to or larger than a second set luminance value, the processor decreases the crosstalk value of the parallax barrier 3D image by reducing the open slit ratio, based on a difference between the second set luminance value and the average luminance value of the disparity image.

3. The display apparatus for vehicle of claim 1, wherein when the open slit ratio is adjusted, the processor adjusts the disparity image so that the disparity image and the parallax barrier correspond to each other.

4. The display apparatus for vehicle of claim 1, wherein the barrier unit includes a plurality of barrier areas,
wherein the processor adjusts open slit ratios of the plurality of barrier areas individually, based on an average luminance value of each portion of the disparity image corresponding to each of the plurality of barrier areas.

5. The display apparatus for vehicle of claim 4, wherein the image output unit includes a plurality of image areas from which a plurality of images corresponding to the plurality of barrier areas are outputted,
the processor adjusts the open slit ratios of the plurality of barrier areas individually based on an average luminance value of each of the plurality of image areas.

6. The display apparatus for vehicle of claim 5, wherein among the plurality of image areas, the processor adjusts an open slit ratio of a barrier area corresponding to an image area from which a two-dimensional (2D) image is outputted to 100%, and adjusts an open slit ratio of a barrier area corresponding to an image area from which a disparity image is outputted based on an average luminance value of the outputted disparity image.

7. The display apparatus for vehicle of claim 5, further comprising an input unit configured to receive a user input,
wherein the processor outputs an image selected based on the user input to an image area that is selected based on the user input among the plurality of image areas.

8. The display apparatus for vehicle of claim 1, wherein, when the open slit ratio is adjusted, the processor adjusts a backside distance which is a gap between the barrier unit and the image output unit, based on the adjusted open slit ratio.

9. The display apparatus for vehicle of claim 8, wherein the processor adjusts the backside distance so that the open slit ratio is inversely proportional to the backside distance.

10. The display apparatus for vehicle of claim 1, wherein the average luminance value of the disparity image is an average value of a luminance of a plurality of pixels included in the image output unit, when the disparity image is outputted.

11. A method of controlling a display apparatus for vehicle for outputting a parallax barrier three-dimensional (3D) image, the method comprising:
outputting a parallax barrier 3D image by outputting a disparity image to an image output unit and implementing a parallax barrier in a barrier unit;
measuring an average luminance value of the disparity image; and
adjusting an open slit ratio of the barrier unit, based on the average luminance value of the disparity image,
wherein adjusting the open slit ratio comprises increasing a luminance of the parallax barrier 3D image or decreasing a crosstalk value of the parallax barrier 3D image, by adjusting the open slit ratio to be in inverse proportion to the average luminance value of the disparity image, and
wherein increasing the luminance of the parallax barrier 3D image comprises:
based on the average luminance value of the disparity image being equal to or less than a first set luminance value, increasing the luminance of the parallax barrier 3D image by increasing the open slit ratio, based on a difference between the first set luminance value and the average luminance value of the disparity image.

12. The method of claim 11, wherein adjusting the open slit ratio comprises:
decreasing the crosstalk value of the parallax barrier 3D image by decreasing the open slit ratio, based on a difference between a second set luminance value and the average luminance value of the disparity image, when the average luminance value of the disparity image is equal to or larger than the second set luminance value.

13. The method of claim 11, further comprising adjusting the disparity image so that the disparity image corresponds to the parallax barrier, after the open slit ratio is adjusted.

14. The method of claim 11, further comprising adjusting a backside distance which is a gap between the barrier unit and the image output unit, based on the adjusted open slit ratio, after the open slit ratio is adjusted.

15. The method of claim 14, wherein adjusting a backside distance comprises adjusting the backside distance so that the open slit ratio is inversely proportional to the backside distance.

16. The method of claim 11, further comprising:
receiving a user input for the luminance of the parallax barrier 3D image or the crosstalk value of the parallax barrier 3D image; and
adjusting the open slit ratio of the barrier unit so that the luminance of the parallax barrier 3D image or the crosstalk value of the parallax barrier 3D image is changed, in response to the received user input.

17. A display apparatus for vehicle comprising:
a display unit configured to include a barrier unit and an image output unit; and
a processor configured to output a parallax barrier three-dimensional (3D) image to the display unit by implementing a parallax barrier in the barrier unit and outputting a disparity image to the image output unit, and to adjust an open slit ratio of the barrier unit based on an average luminance value of the disparity image,
wherein the barrier unit includes a plurality of barrier areas, and
wherein the processor is configured to adjust open slit ratios of the plurality of barrier areas individually based on an average luminance value of each portion of the disparity image corresponding to each of the plurality of barrier areas.

* * * * *